Figure 1:
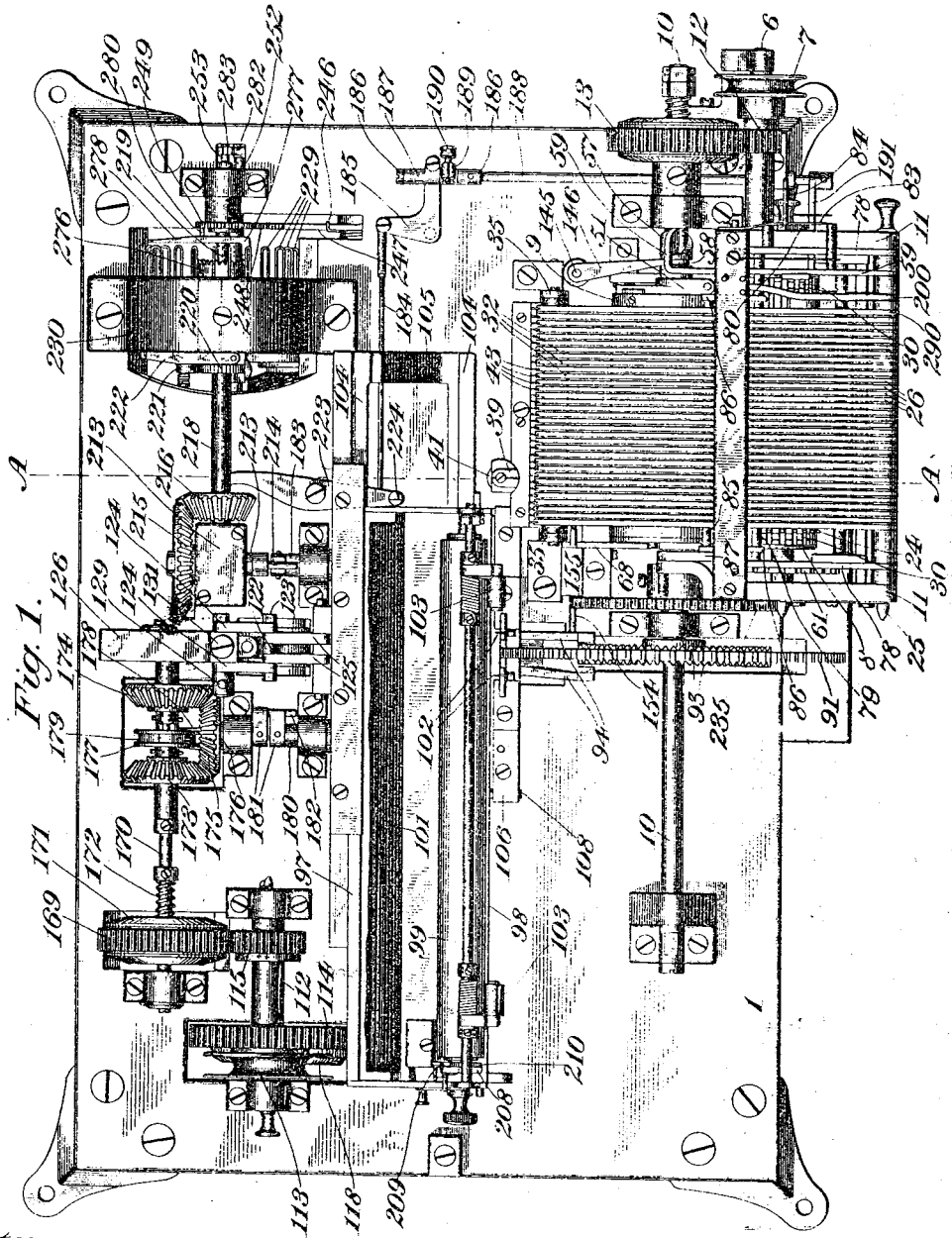

C. T. MOORE.
AUTOMATIC TYPOGRAPHIC APPARATUS.
APPLICATION FILED SEPT. 27, 1901. RENEWED MAR. 21, 1911.

1,115,472.  Patented Oct. 27, 1914.
13 SHEETS—SHEET 1.

C. T. MOORE.
AUTOMATIC TYPOGRAPHIC APPARATUS.
APPLICATION FILED SEPT. 27, 1901. RENEWED MAR. 21, 1911.

1,115,472.

Patented Oct. 27, 1914.
13 SHEETS—SHEET 2.

C. T. MOORE.
AUTOMATIC TYPOGRAPHIC APPARATUS.
APPLICATION FILED SEPT. 27, 1901. RENEWED MAR. 21, 1911.

1,115,472.

Patented Oct. 27, 1914.

13 SHEETS—SHEET 3.

Witnesses:
Inventor:

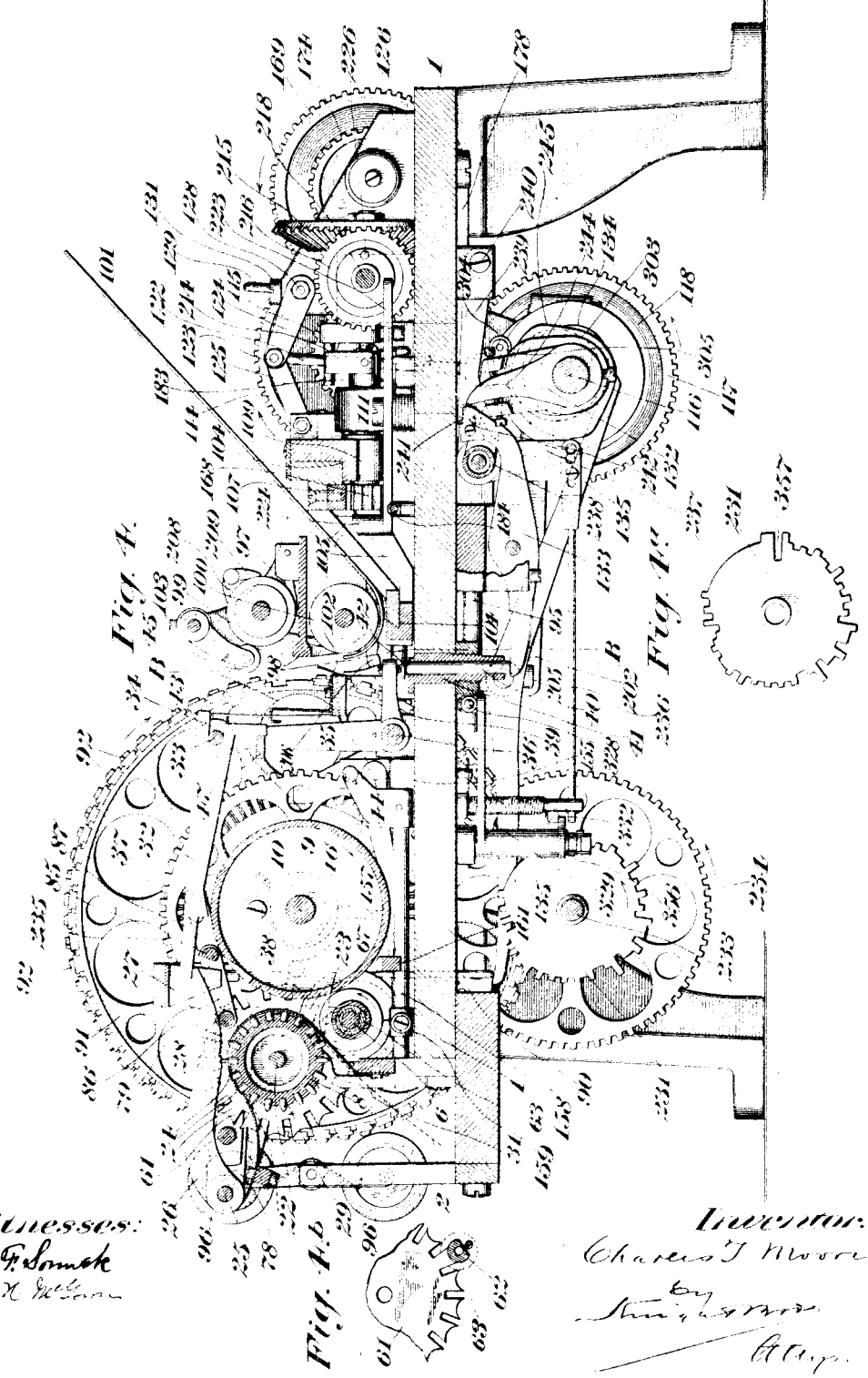

C. T. MOORE.
AUTOMATIC TYPOGRAPHIC APPARATUS.
APPLICATION FILED SEPT. 27, 1901. RENEWED MAR. 21, 1911.
1,115,472.
Patented Oct. 27, 1914.
13 SHEETS—SHEET 5.
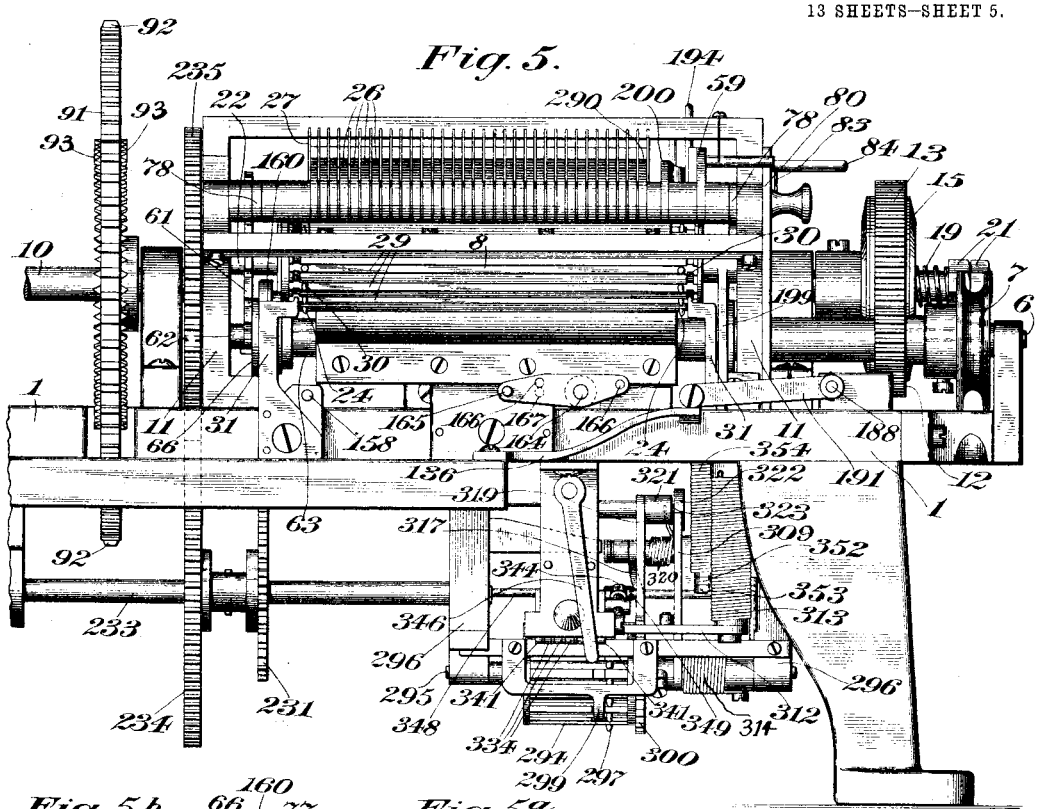
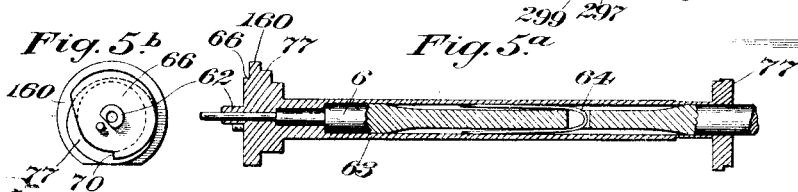
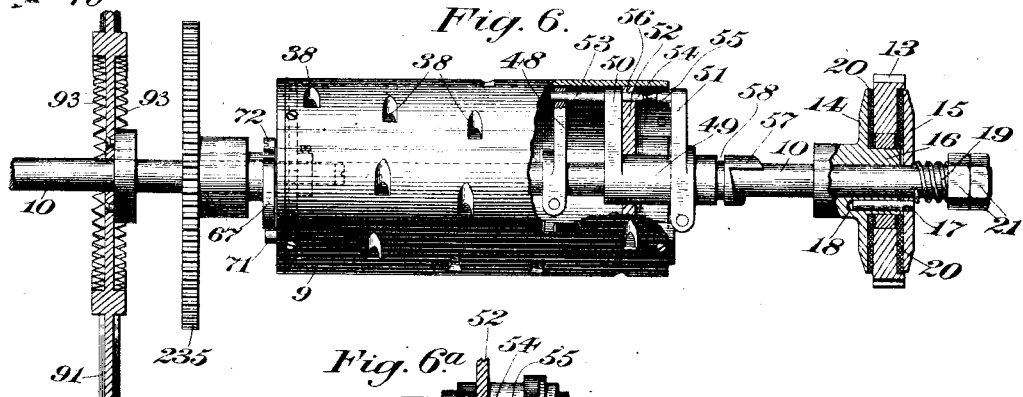
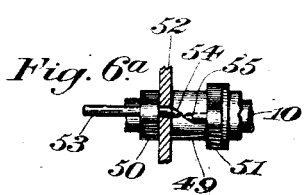
Witnesses:
Inventor:
Charles T. Moore

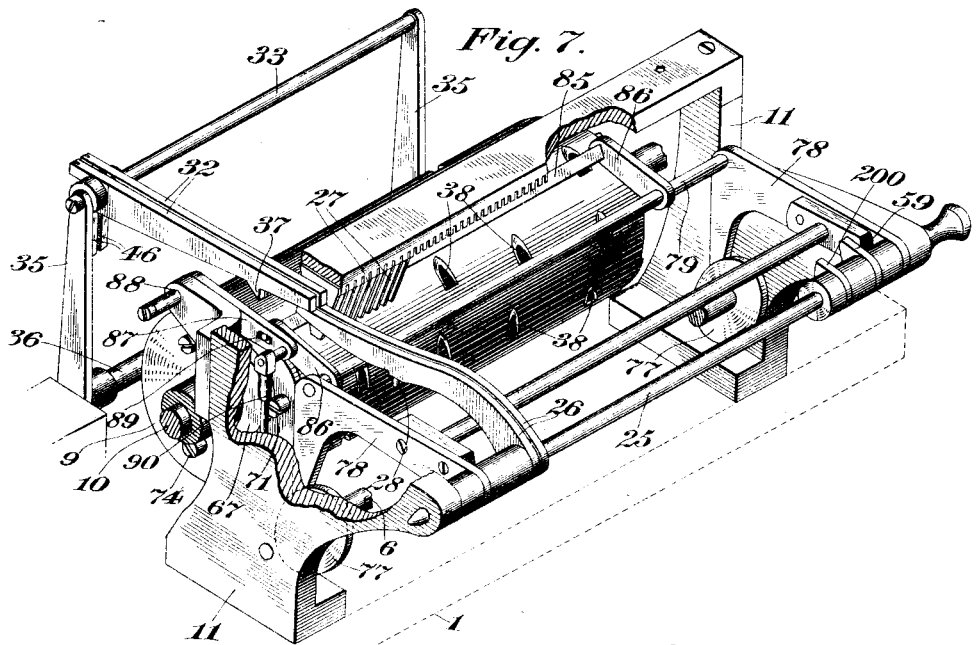
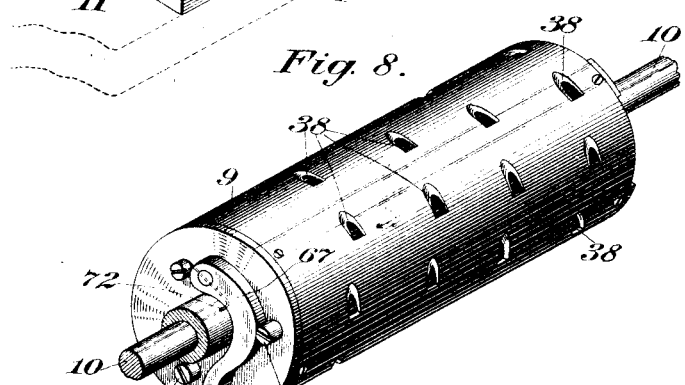
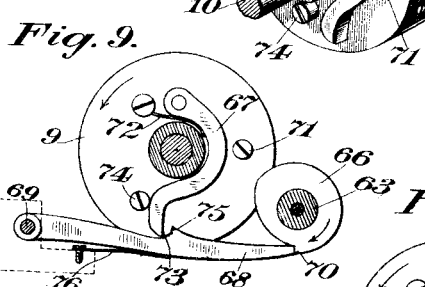
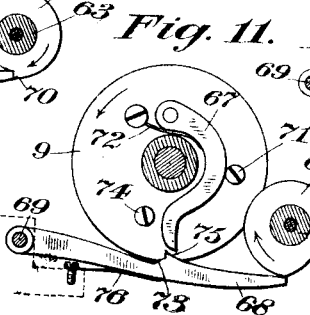
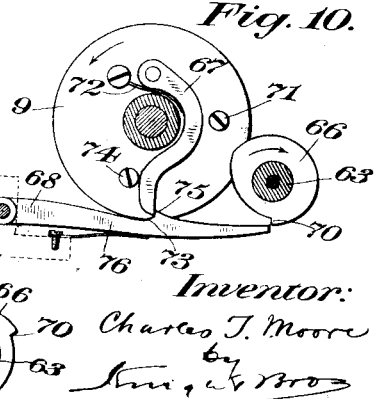

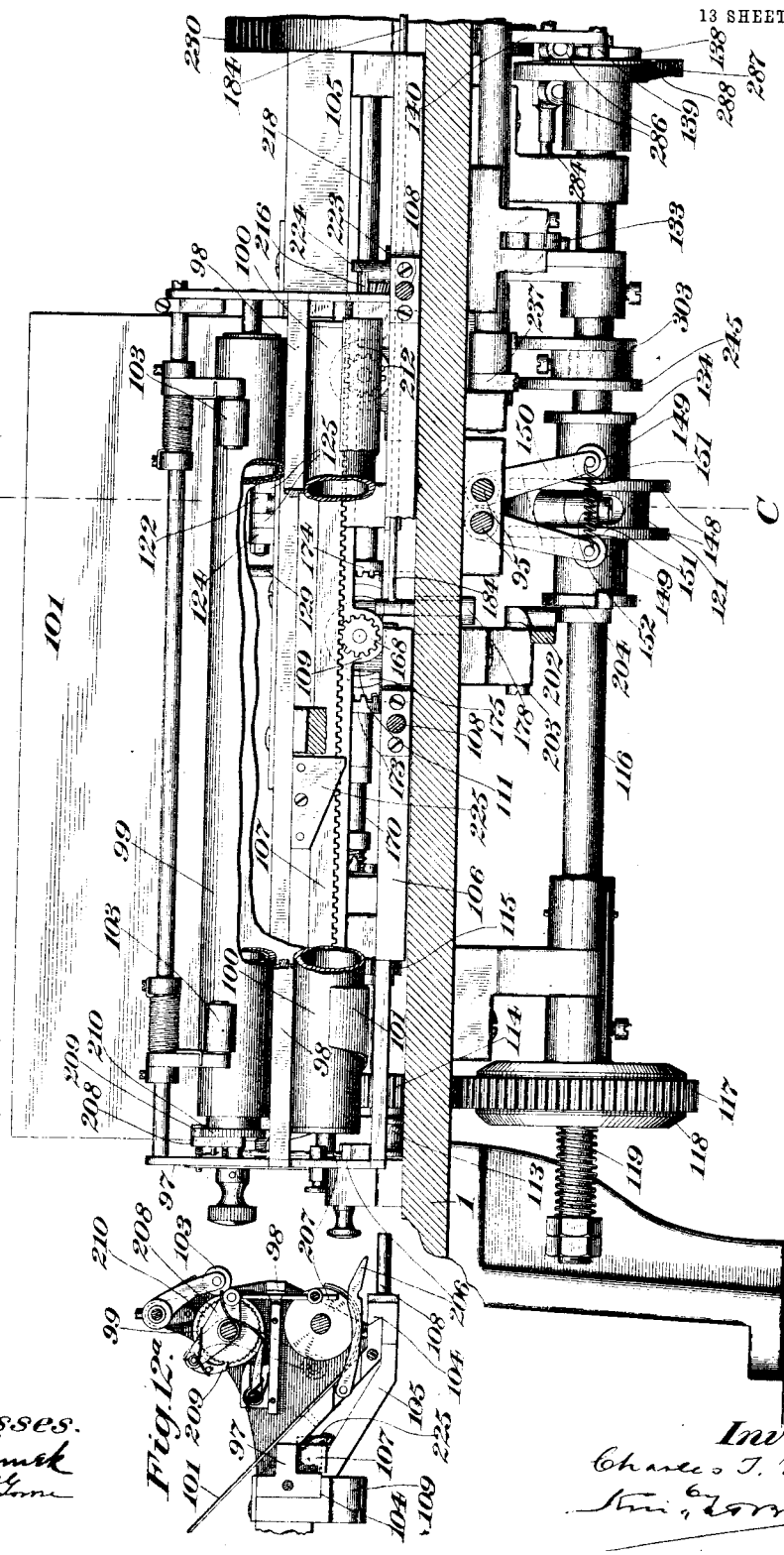

C. T. MOORE.
AUTOMATIC TYPOGRAPHIC APPARATUS.
APPLICATION FILED SEPT. 27, 1901. RENEWED MAR. 21, 1911.
1,115,472.
Patented Oct. 27, 1914.
13 SHEETS—SHEET 8.
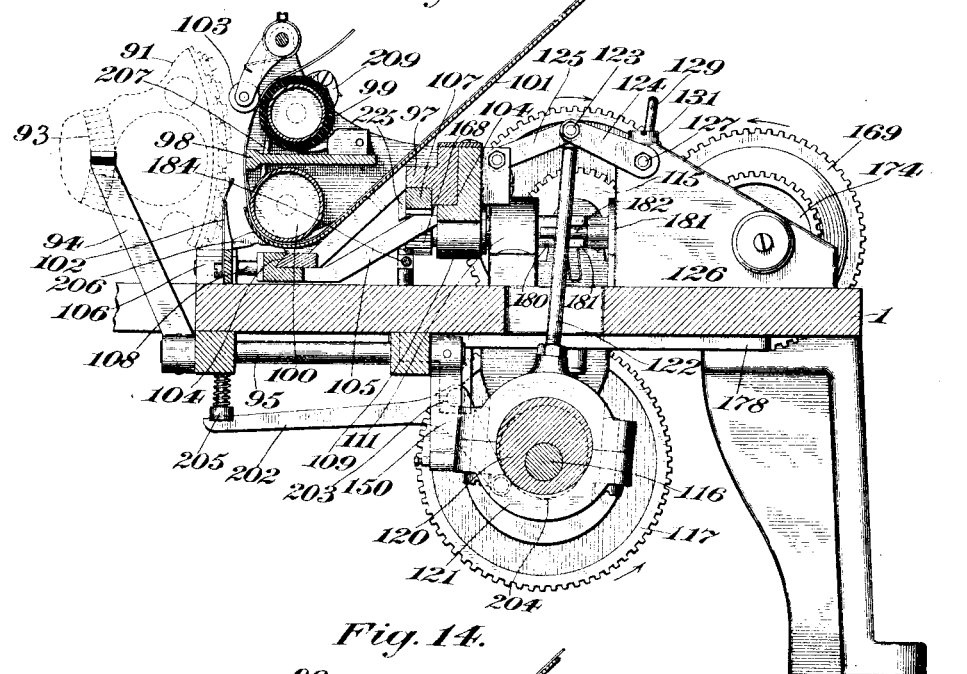
Fig. 13.
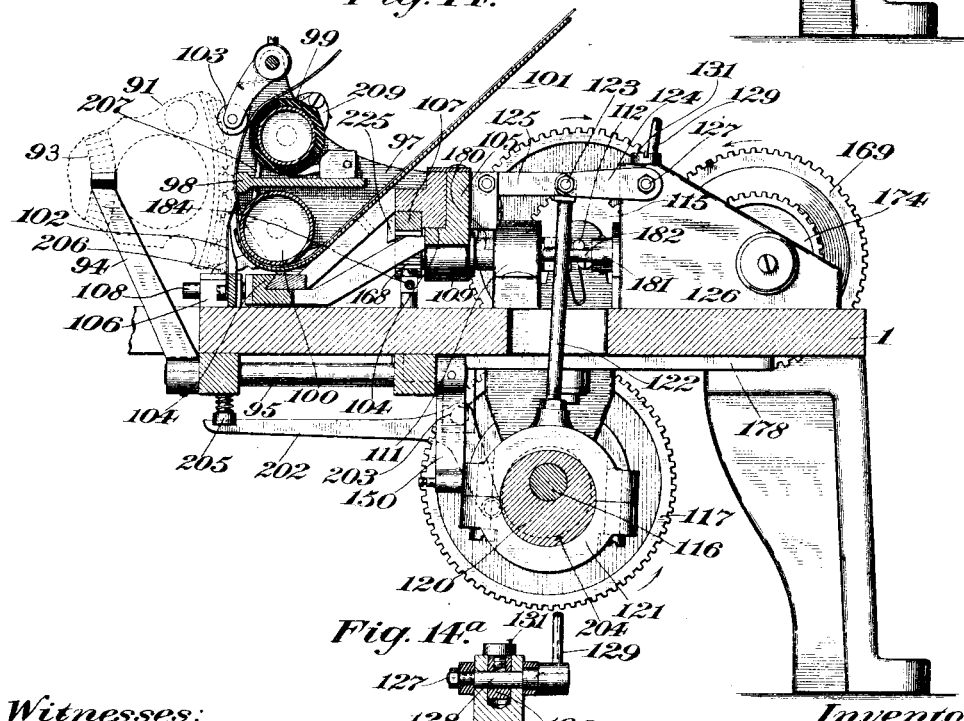
Fig. 14.
Fig. 14a.
Witnesses:
Inventor:
Charles T. Moore C. T. MOORE.
AUTOMATIC TYPOGRAPHIC APPARATUS.
APPLICATION FILED SEPT. 27, 1901. RENEWED MAR. 21, 1911.

1,115,472.
Patented Oct. 27, 1914.
13 SHEETS—SHEET 9.

Fig. 16ª

Witnesses:

Inventor.
Charles T. Moore

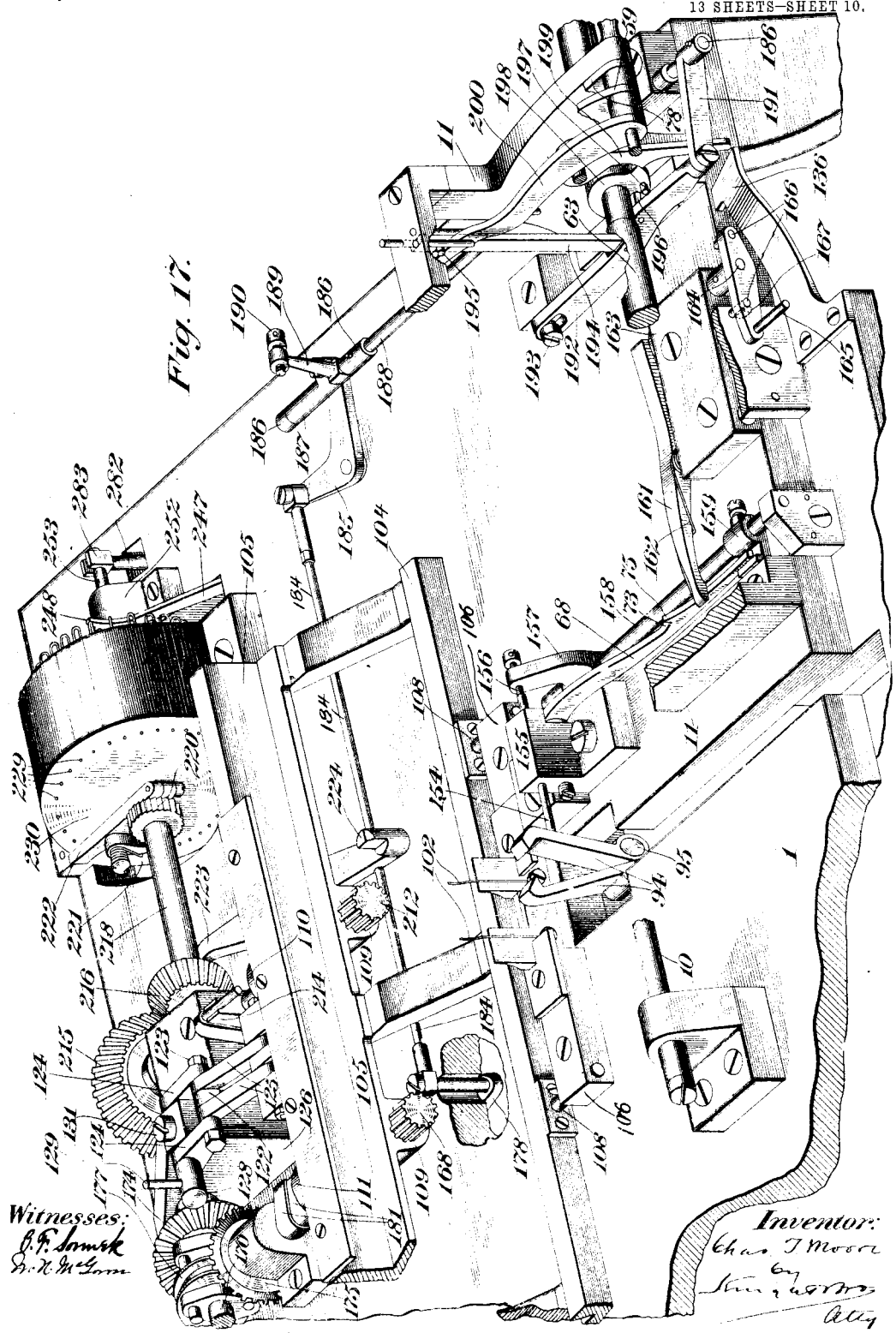

C. T. MOORE.
AUTOMATIC TYPOGRAPHIC APPARATUS.
APPLICATION FILED SEPT. 27, 1901. RENEWED MAR. 21, 1911.
1,115,472.
Patented Oct. 27, 1914.
13 SHEETS—SHEET 11.
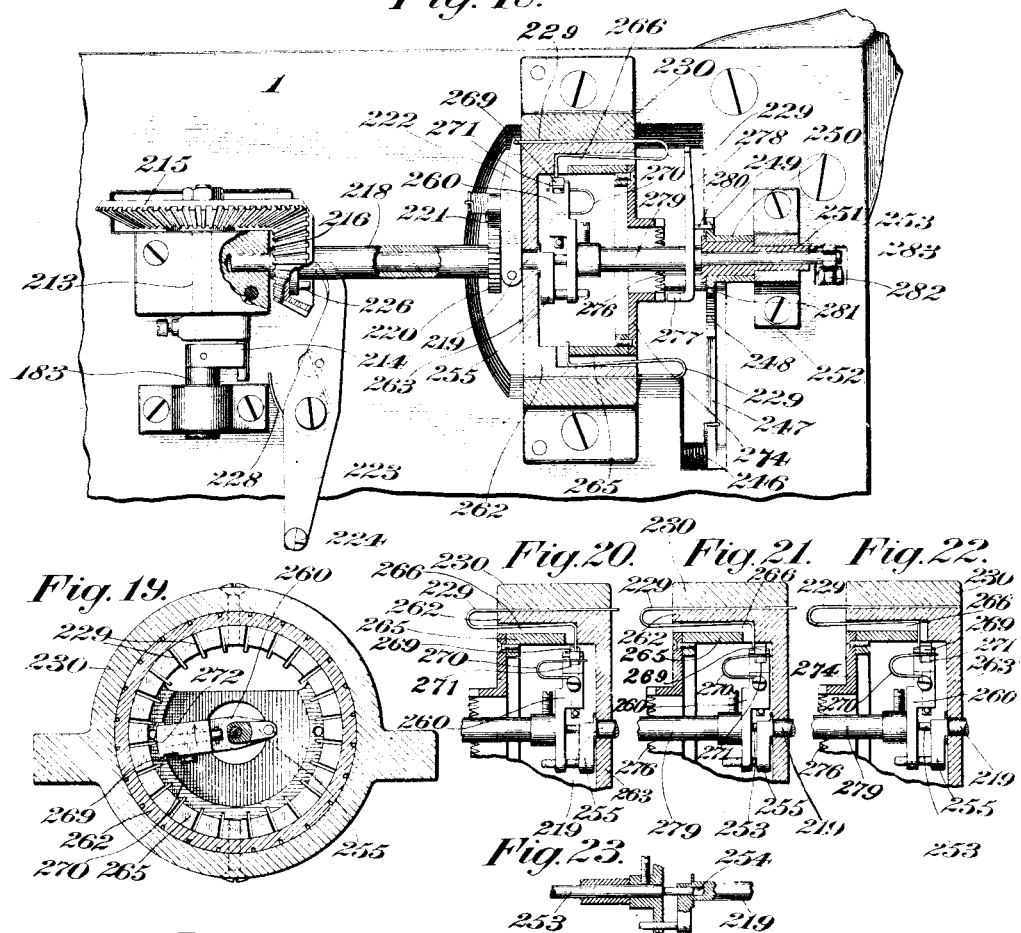
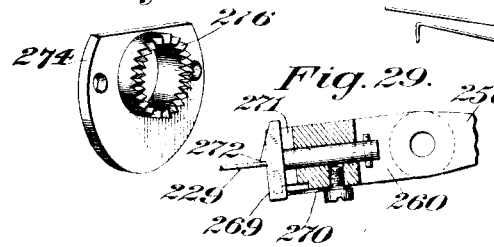

C. T. MOORE.
AUTOMATIC TYPOGRAPHIC APPARATUS.
APPLICATION FILED SEPT. 27, 1901. RENEWED MAR. 21, 1911.

1,115,472.

Patented Oct. 27, 1914.
13 SHEETS—SHEET 12.

Witnesses:

Inventor:
Charles T. Moore

C. T. MOORE.
AUTOMATIC TYPOGRAPHIC APPARATUS.
APPLICATION FILED SEPT. 27, 1901. RENEWED MAR. 21, 1911.
1,115,472.
Patented Oct. 27, 1914.
13 SHEETS—SHEET 13.
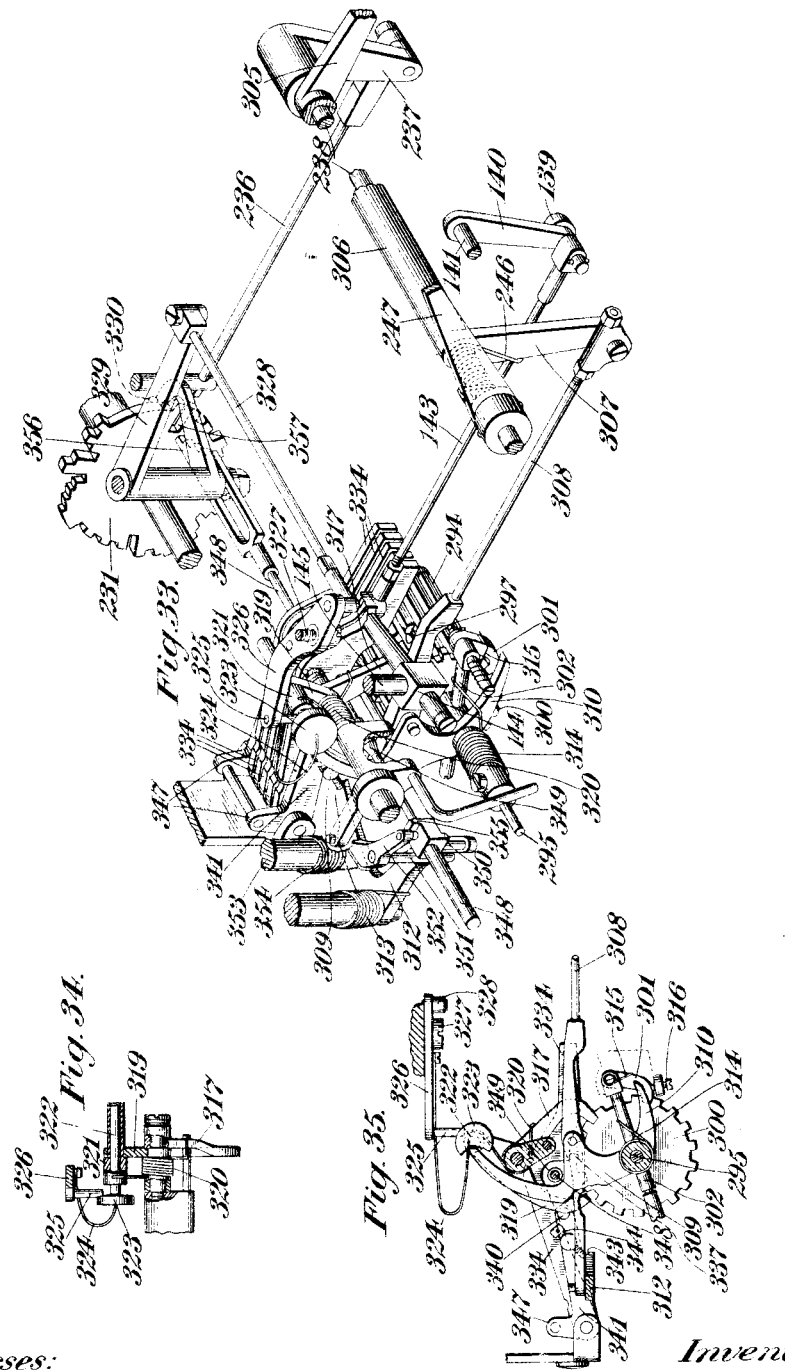

UNITED STATES PATENT OFFICE.

CHARLES T. MOORE, OF WASHINGTON, DISTRICT OF COLUMBIA, ASSIGNOR, BY MESNE ASSIGNMENTS, TO JAMES G. COFFIN, TRUSTEE.

AUTOMATIC TYPOGRAPHIC APPARATUS.

1,115,472.  Specification of Letters Patent.  Patented Oct. 27, 1914.

Application filed September 27, 1901, Serial No. 76,783. Renewed March 21, 1911. Serial No. 616,023.

*To all whom it may concern:*

Be it known that I, CHARLES T. MOORE, a citizen of the United States, residing at Washington, in the District of Columbia, have invented certain new and useful Improvements in Automatic Typographic Apparatus, of which the following is a specification.

An object of my invention is to produce machines having all the requirements for producing printed matter in suitable form, and in a manner to adapt it for use as a planographic design, to the end that the printed matter may be used, instead of relief forms, as an original in the multiplication of copies. This and other objects of invention will appear more fully hereinafter.

My invention consists in the several novel features hereinafter pointed out and claimed, and in the bringing together of different elements belonging to the several classes of machines above referred to, and so combining them with each other and with the special novel features shown and described, in a manner to accomplish the end in view.

The invention comprises a composing ribbon or tape produced by any suitable means and provided with perforations or equivalent marks, depressions, etc., for selecting the letters and characters and performing other necessary functions.

It also comprises a companion strip provided with perforations for controlling mechanism for justifying the line. The composing and justifying ribbons or strips when placed in a machine of the character hereinafter described will serve to control the operation of the machine so as to cause the characters to be printed in a predetermined manner, and to justify the lines.

The invention comprises mechanism herein termed the controlling mechanism, for receiving the master strip and feeding it forward as required; type mechanism provided with the characters to be printed; means coöperating with the ribbon or tape for controlling the movement of the type mechanism to position the character to be printed; impression mechanism for taking an impression after the proper character is brought to position; carriage mechanism for the impression receiving surface; letter space and carriage feed mechanism; suitable inking devices; and means for changing alphabets so that the perforations or letter indications in or upon the ribbon or tape for one alphabet will upon such change represent the letters and characters of another alphabet.

I have herein shown my invention as embodied in a machine provided with a type wheel and mechanism controlled by a composing or master strip and a justifying strip, but I do not desire to be limited to any particular expedient as to these or other equivalent forms, the invention contemplating the providing of mechanism adapted to coöperate with a composing ribbon combined with mechanism controlled by a justifying device other than said ribbon, in connection with a type carrier, and inking and impression mechanism, all of which are automatically operated to produce a plurality of justified lines in which the letters and characters will correspond to those designated on the composing strip.

The method of printing above referred to may be of advantage when applied to a typewriter, especially when it is desired to produce a limited number of copies, as, by making the master strip run through the machine a number of times, any desired number of copies may be turned out at a minimum of expense, labor and time, and each copy will be "original" and perfect. After a proof copy has been run out, the master strip may be corrected and the copies thereafter made will have a perfection and uniformity of appearance impossible to attain with the ordinary typewriter. One of the greatest advantages, however, results from the justifying feature by which the characters, although printed successively, are so positioned as to justify each line, thus giving a product which is of better appearance for ordinary purposes than typewritten work. The greatest value of my invention, however, it is believed will be found in printing upon a suitable surface for making transfers and creating planographic designs for book, letter press or general publishing work.

The accompanying drawings, referred to herein and forming a part hereof, illustrate one embodiment of the invention, the same serving in connection with the description herein, to explain the principles of the invention.

Figure 2:
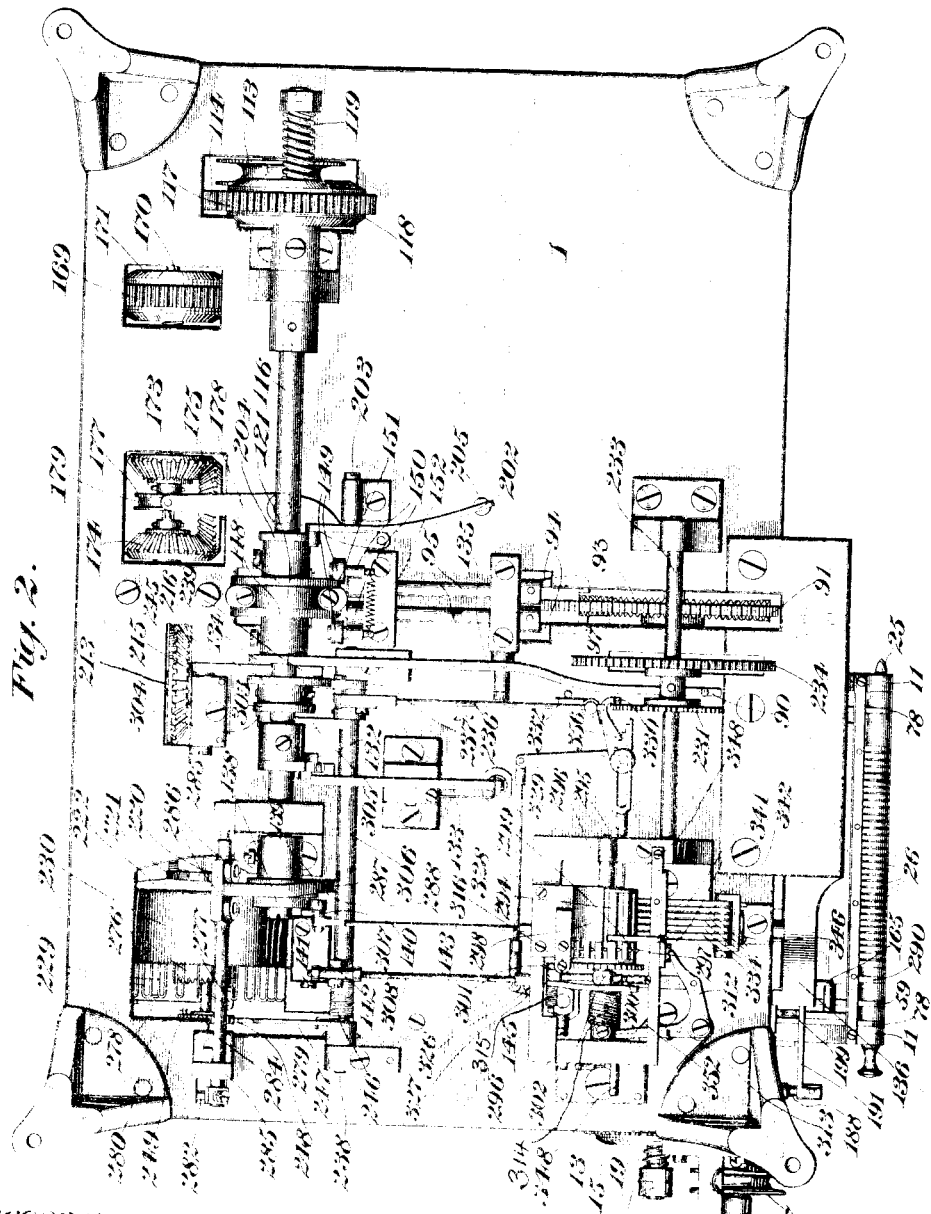
Figure 3:
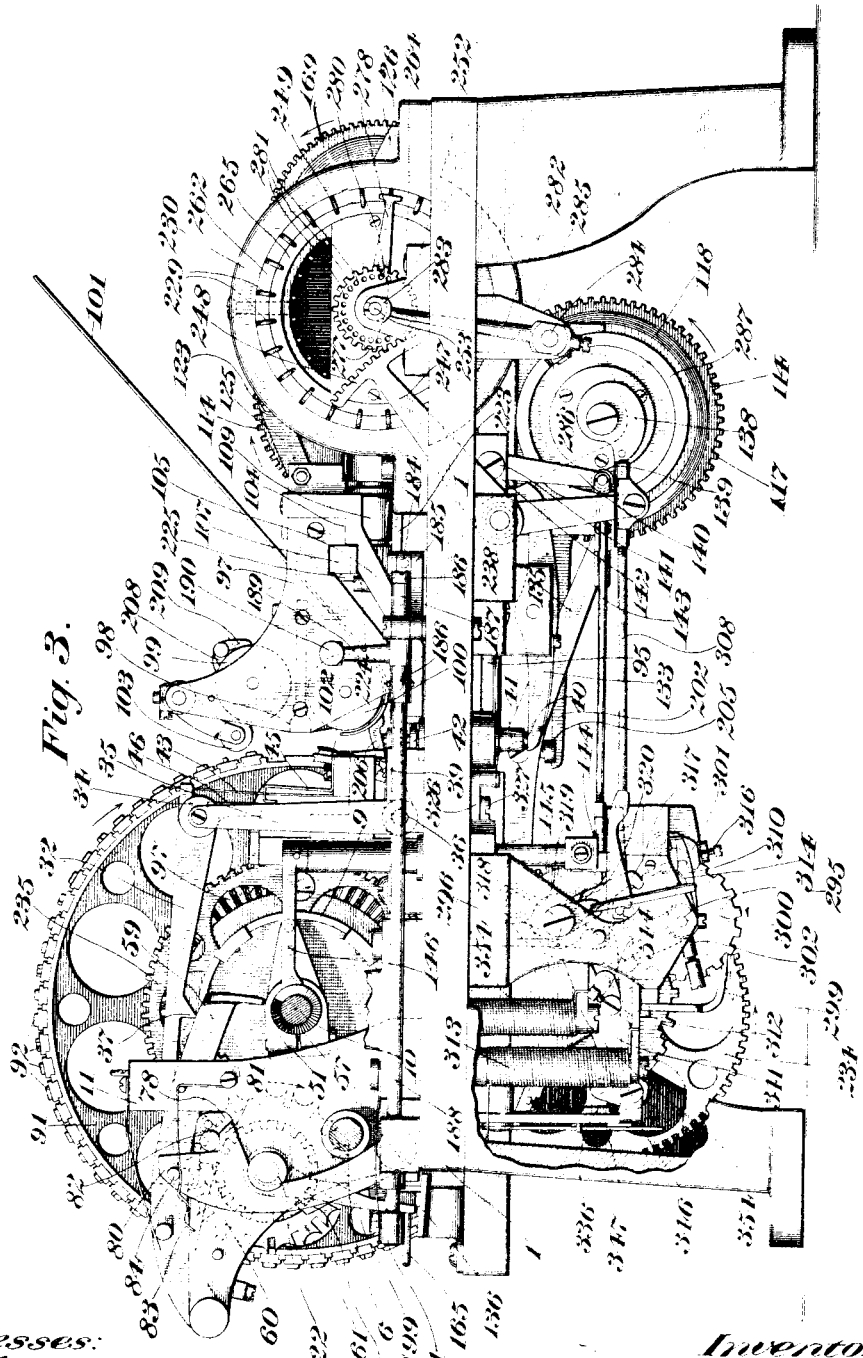
Figure 15:
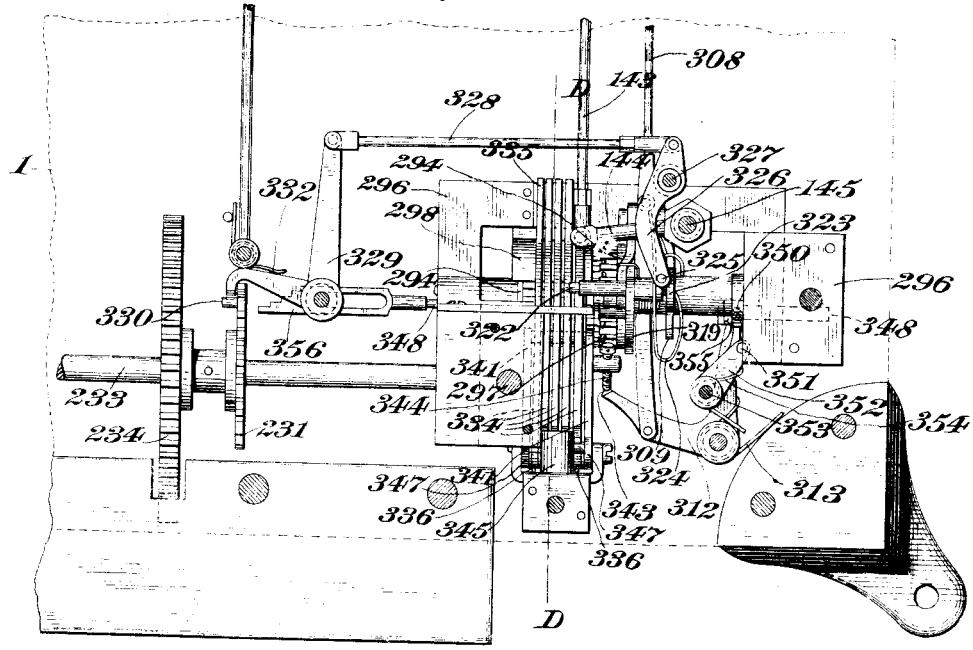
Figure 16:
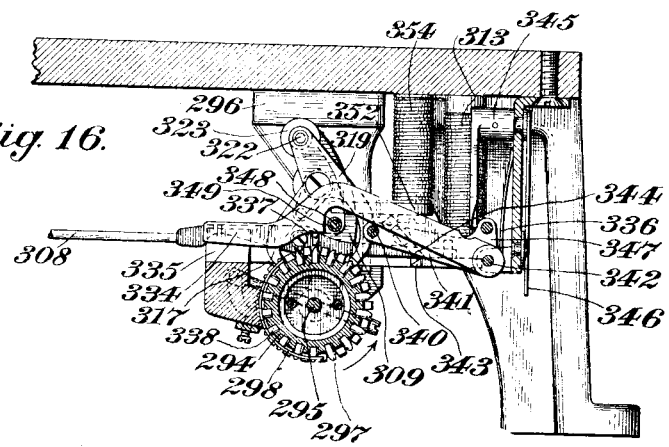
Figure 31:
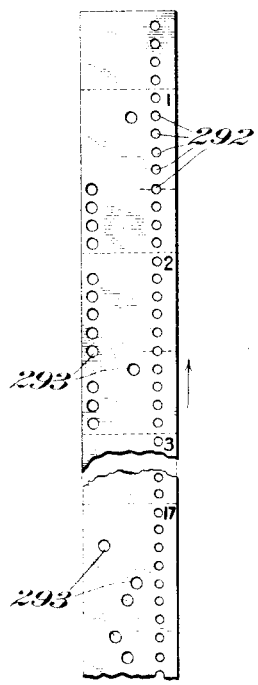
Figure 30:
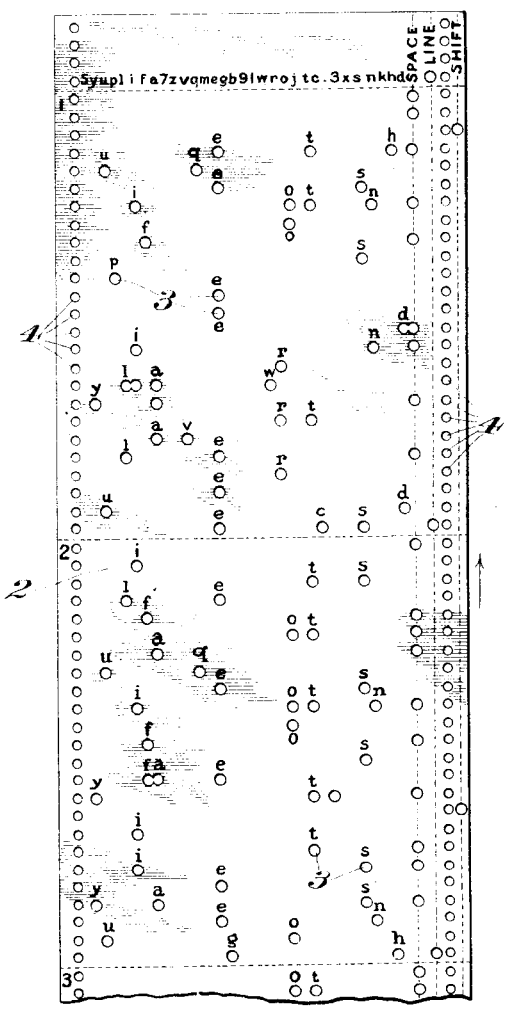
Figure 32:
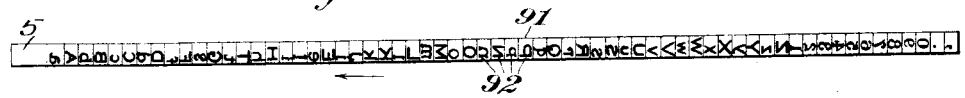

Of the drawings: Figure 1 is a plan view of the printing apparatus embodying my invention; Fig. 2 is an underside view of the same; Fig. 3 is a side view, partly broken away, looking in the direction of the arrow in Fig. 1; Fig. 4 is a vertical transverse section on the line A—A in Fig. 1; Figs. 4ª and 4ᵇ are detail views of parts shown therein; Fig. 5 is a view of the controlling lever mechanism for receiving the composing strip and controlling the indexing or positioning of the type wheel; Figs. 5ª and 5ᵇ are detail views of a shaft and cams appertaining to the parts shown in Fig. 5; Fig. 6 is a partly sectional side elevation of a cylinder or drum of the controlling mechanism; Fig. 6ª is a detail of a shift device connected with said cylinder; Fig. 7 is a perspective view of the aforesaid controlling mechanism with portions thereof omitted; Fig. 8 is a similar view of the controlling drum shown in Fig. 7; Figs. 9, 10 and 11 are end views of the said drum and associated cam and stop devices showing different positions of said devices; Fig. 12 is a vertical longitudinal section adjacent to the carriage and impression mechanisms on the line B—B in Fig. 4; Fig. 12ª is an end view of the carriage mechanism; Figs. 13 and 14 are transverse sections through the impression mechanism on the line C—C in Fig. 12; Fig. 14ª is a detail view of an adjusting means for the impression devices; Fig. 15 is a plan view of the justifying devices with certain parts removed; Fig. 16 is a section upon the line D—D in Fig. 15; Fig. 16ª is a view of a detail of the justifying devices; Fig. 17 is a perspective view of certain devices situated beneath the controlling and printing devices, the latter being removed; Fig. 18 is a horizontal axial section of the carriage feed controlling devices; Figs. 19 to 29 are detail views of parts thereof; Figs. 30 and 31 show respectively, portions of the master strip and of the justifying strip; Fig. 32 is a development of the type wheel periphery; Fig. 33 is a detail perspective view of the justification mechanism; and Figs. 34 and 35 are details showing parts of said justification mechanism.

As herein shown the machine comprises controlling mechanism adapted to receive and coöperate with the composing or master strip to control the machine, a type wheel brought to position by the controlling mechanism to print the character selected by the strip, carriage mechanism with feeding means, impression devices for bringing the impression-receiving surface and the type into contact, inking means and justifying means. All these parts are mounted in a suitable frame 1. Separate driving connections are shown for the controlling mechanism and for the carriage and its associated feeding and impressing means, but they may be driven in any suitable manner.

The composing or master strip 2, see Fig. 30, consists of a strip of paper or other suitable material, provided with perforations, arranged in correspondence with the matter to be printed as hereinafter described, some of these perforations, indicated by numeral 3, controlling the selection of the characters, others the spacing between words, and for paragraphing, etc., and still others the carriage feed from line to line, indicated on the drawings by the letters marked thereon and by the words "Space", "Line" and "Shift". The "shift" holes govern the change of "case", the type carrier being, in the machine shown in the form of a wheel, provided with two sets of type on its periphery, which are brought into operation under the control of the strip. Near each edge of the strip is a continuous and uniformly spaced series of holes 4, termed the "sprocket holes", whose function is in feeding and alining the master strip. A justifying strip, shown in Fig. 31, is also provided and will be hereinafter described. The master strip and the machine controlled thereby are herein shown as adapted to a type carrier having the type characters arranged in order of sequence as shown in Fig. 32 the upper and lower case characters being arranged in alternation and the space marked 5ª being a blank space.

The controlling mechanism, (Figs. 1 to 11), comprises a driving shaft 6, with driving pulley 7 to, receive the power, and a drum or cylinder 8, more clearly shown in Fig. 4, to receive the perforated master strip, a stop cylinder 9 mounted on a shaft 10 which carries the type carrier, said cylinder controlling the position of the type carrier, the cylinder being controlled by a series of selecting levers which are controlled by a master strip, serving to govern the selecting, positioning and imprinting of the letters and characters, as well as to control other functions such as the line-feed, carriage return, space and case shift movements. The shafts for the cylinders 8, 9, and the controlling mechanism are mounted in suitable brackets or side supports 11, 11.

The driving shaft 6, see Figs. 1, 5 and 6, carries pinion 12 engaging with a gear 13 loosely mounted on the shaft 10 but having frictional connection of any suitable kind, it being herein shown (see Fig. 6) as consisting of disks 14, 15 embracing the gear 13, the hub 16 of disk 14 being attached rigidly to shaft 10 and disk 15 carrying a pin 17 engaging in a hole 18 in hub 16 so that the disks 14, 15 rotate with the shaft 10 but disk 15 can move longitudinally on said 3 and 4, the opposite end of lever 133 engaging with the sliding pin 40 which is operated by the rocking frame 35, when any pawl 32 of the stop cylinder mechanism is pushed back, this being the moment when a type has been arrested at printing position and an impression is to be effected. A spring 133ª serves to restore lever 133 and pin 40.

The operation of shaft 116 besides effecting the impression performs other functions. Among these it serves to restore to normal position certain parts of the controlling mechanism, namely, the stop pawls 32, which have been operated, and also the shift device, if it has been operated. A cam 134 on the said shaft engages one end of a lever 135 pivoted to frame 1, the opposite end of said lever engaging a vertically sliding rod 90 extending through the frame 1, (by which it is guided) said rod being pivoted to the arm 87, (Figs. 4 and 7) so as to raise said link and the connecting rod 85, thus lifting out of engagement with the stop cylinder any pawl 32, the pawl being then immediately thrown forward by the springs 42. It will be observed that the rod 85 does not operate upon the levers 26 but only on pawls 32, and that said rod will lift all the pawls 32 which may have been dropped into contact with the stop cylinder by reason of their respective selecting levers having found perforations in the master strip.

When cam 134 on shaft 116 permits the lever 135 to retract, and through rod 90 to restore rod 85 to normal position, the pawls 32 that have been in contact with the stop cylinder 9 return into such contact, and the cylinder 9, having been released to the action of the power in the manner hereinafter described will rotate until again arrested by a pawl engaging one of the notches 38, when the impression mechanism will again be brought into operation in the manner heretofore described, and the operations previously described will be repeated until the characters represented by the perforations upon the transverse line of the ribbon last fed into position to register with the nibs on levers 26 have all been imprinted, when the rod 79 will disengage the levers 26, and the master strip will be fed forward by the proper mechanism to bring the next line of perforations into position. Shaft 116 carries another cam 138, engaging a roll 139 on arm 140 pivoted at 141 to block 142 on frame 1, said arm being connected by rod 143 (see Fig. 3) to an arm 144 on a vertical rock shaft 145 pivoted in frame 1 and carrying at is upper end an arm 146 engaging with the circular groove 58, (see Figs. 1 and 6) in the shifting sleeve 49 on the stop cylinder shaft, so as to restore said sleeve and the type wheel shift mechanism to normal position during operation of the shaft 116.

The mechanism for locking the type wheel, (Figs. 1, 2, 4 and 17), is controlled by cams 148 on shaft 116, engaging rolls 149 (Fig. 12) on the ends of arms 150 on rock shafts 95 carrying the locking arms 94 (see Fig. 17) above referred to for locking the type wheel. Normally, the rolls 149 rest in depressions 151, see Fig. 12, in cams 148, but when shaft 116 rotates, the rolls pass out of these depressions and the arms 94 are caused to enter the teeth of crown locking rings 92 on the sides of the type wheel, holding the latter firmly until after the impression, when a spring 152 pulls arms 150 together and releases the type wheel by opening the lock arms 94. One of the locking arms 94 is also controlled by direct connection with the controlling mechanism by means of a rod 154, see Fig. 17, sliding in a fixed guide 155 and engaged by a screw pin 156 on an arm 157 carried by a rock shaft 158 which is pivoted in brackets attached to frame 1 and carries a lug or arm 159 engaging cam 160, (see Fig. 5) on the hollow shaft 63 being normally against the "flat" on said cam shown in Fig. 5ᵇ. When shaft 63 rotates, the full diameter portion of said cam rides over said lug 159 and depresses the same, causing arm 157 to rock, and, through the rod 154 presses the locking arm 94 into position to lock the type wheel. By this means the type wheel is locked during the feed of the master strip. A manually operated lock is also provided, consisting of a lever 161 normally directly over the trip lever 68, above referred to, but held away from same by its spring 162 but capable of being operated by a cam 163 on a shaft 164 having a handle 165, so as to depress lever 161, see Fig. 17, against lug 159 through the trip lever 68, over which it is located, this depression of lug 159 locking the type wheel as above described. The depression of lever 68 also releases it from the cam and stop wheel 66, so as to permit the shaft 63 to run freely, thus facilitating the insertion of the master strip into the machine. The handle 165 is provided with stop pins 166 engaging with fixed pin 167.

The carriage feed driving mechanism (Figs. 1, 2, 13, 14 and 17) comprises a gear 169 engaged by the gear 115 on driving shaft 112, and a shaft 170 journaled in brackets supported on frame 1, the gear 169 being frictionally connected to the shaft 170 by frictional driving means similar to the stop cylinder shaft above described and shown in Fig. 6. Shaft 170 carries two loose bevel gears 173, 174, meshing on opposite sides of a beveled gear 175, on a shaft 176. A clutch collar 177 rotates with shaft 170, but is movable thereon to engage either same time allowed to rise into normal position, shown in Fig. 9, under the influence of a spring 76.

Before the rotation of shaft 63 can operate the master strip cylinder 8, through the Geneva stop device, the selecting lever or levers 26 which have been allowed to drop by reason of the perforations in the line then in action must be lifted. This is effected by cams 77 near opposite ends of shaft 63 (see Figs. 5ª and 5ᵇ) which engage with arms 78 (see Fig. 7) pivoted on the rod 25. In the first part of their rotation said cams lift said arms 78 and thereby lift a cross rod 79 connecting said arms and extending under all of the selecting levers 26 as well as the "shift" and "line" levers hereinafter described. The movement of the master strip then takes place and the levers 78 and rod 79 are allowed to fall again. A hand-operated lever 80, see Fig. 3, engaging by a cam projection 81 with a pin 82 on one of the arms 78, enables said arms with rod 79 to be lifted whenever desired so as to throw all the selecting levers and stop pawls out of operation and leave the master strip cylinder and stop cylinder free. A snap spring 83 engaging with a pin 84 on lever 80 maintains said lever in either operative or inoperative position. Another cross rod 85 (see Fig. 7) extends under all the pawls 32 and is connected to rod 79 by links 86 so that either rod 79 or 85 can rise or fall independently of the other. A lever 87 pivoted at 88 to an extension of the bracket 11 engages by pivoted slot connection 89 with the rod 85 and is also pivoted to a vertical rod 90 sliding vertically in the frame or bed 1 and operated by a restoring means hereinafter described to lift the rod 85 and raise any pawl 32 which may have fallen into a notch, back to its normal position, the frame constituted by rod 85 and links 86 turning at this time on rod 79 as a pivot. The spring 43 will act, as soon as the pawl is free from its notch, to restore its pawl 32 to its normal position, frame 35 being restored by spring 133ª. Shaft 63 also carries a cam for controlling the operation of the carriage feed and reversing mechanism and a cam for controlling the locking of the type wheel, which will be hereinafter described.

The type wheel 91, see Figs. 1, 4, 6 and 32, rigid on shaft 10, carries the type 92 and a toothed locking ring or rings 93, whose teeth are engaged by locking cams 94 (Figs. 13, 14 and 17) carried by rock shafts 95 journaled in frame 1, and operated as hereinafter described.

The inking means, see Fig. 4, may be of any kind. I have shown ink rolls 96 which may be supplied with ink by hand or by suitable ink ductor means, and which bear on the faces of the type, so as to apply the ink to same.

The carriage mechanism, see Figs. 13, 14 and 17, comprises the frame 97 formed with platen 98 and with end plates for supporting the paper carrying and feeding rolls 99, 100, and carrying a paper guide 101, and pressure rolls 103. Said carriage is adapted to slide longitudinally on guides 104 on a carrying frame 105, having movement transversely. The carrying frame 105 is guided in its transverse movement, in which the carriage participates, thereby bringing the platen into contact with the type carrier, by pins 108 sliding in bearings 106 at the front and tubular studs, engaging and sliding in holes in lugs 110, 111 on bed plate 1 at the rear. Fixed guides 102 on frame 1 serve to hold the paper away from the type 92. A rack 107 on the carriage is adapted to engage with two pinions, connected respectively to two mechanisms, one of which serves to drive the carriage, while the other serves to control the amount the carriage is allowed to move at each step. The carriage mechanism, including the feeding and impression means, is operated by a driving shaft 112, (Fig. 1) carrying the driving pulley 113 and two gears 114, 115, operating respectively the impression mechanism and the feeding mechanism.

The impression mechanism, Figs. 1, 2, 12, 13 and 14, comprises a shaft 116 journaled in suitable bearings on the underside of bed plate 1 and carrying a spur gear 117 meshing with driving gear 114, the said gear 117 being connected to shaft 116 by a frictional driving connection 118 with spring 119 similar in function to the frictional connection above described for stop cylinder shaft 10. On this shaft 116 is an eccentric 120, see Fig. 14, whose strap 121 is connected by rod 122 to the knuckle 123 of toggle levers 124, 125, one of which, 124, is connected to a fixed abutment or support 126, while the other is pivoted to the carriage frame, 105.

The abutment pivot 127 is eccentrically arranged on a shaft 128 which may be turned by a handle 129, (Fig. 14ª) to adjust the location of the pivot, so as to cause the platen to be brought to the proper point for printing with any particular thickness of paper, a clamp block 130 with screw 131 being provided to clamp the pivot in adjusted position.

The parts are normally in the position shown in Fig. 13, with the toggle bent, but when the shaft 116 is released it makes one rotation and straightens the toggle as shown in Fig. 14, thereby pushing forward the carriage frame, carriage and platen, and effecting the impression and then withdrawing the said parts to normal position. Shaft 116 is normally held from rotation by an arm 132 thereon, engaging with one end of the lever 133 pivoted to frame 1, see Figs.

relatively to the shaft 10. The type carrier being fast to the shaft, changes its relation to the stop cylinder with the said shaft, and this change of relation is just sufficient to bring to the impression point the next contiguous type to the one which would be so brought when the other of the two pins 54, 55 was in engagement with the stop-cylinder head, as the upper and lower case type are arranged alternately upon the type carrier, the shift from one case to the other would be accomplished by the above action. Such longitudinal movement of sleeve 49 is effected by a cam 57 thereon, engaged by a lever 59 (Figs. 1, 3 and 5) pivoted to side frame 11 and carrying a pin 60 (Fig. 3,) adapted to fall into the "shift" perforation of the master strip. When the pin 60 falls into its perforation, the free end of the lever 59 descends into engagement with the cam 57 and as the shaft rotates the sleeve 49 is thus slid along the shaft 10 and the "shift" is accomplished by the action of pins 54 and 55 as indicated above. While the stop cylinder is thus capable of angular adjustment to shift for different case, etc., it is otherwise rotative with the shaft 10 which is stopped thereby. Sleeve 49 is provided with a groove 58 whereby the shifting mechanism is returned to normal position in the next succeeding impression by means hereinafter described.

The feed mechanism for the master strip cylinder, see Figs. 4 to 5ᵇ is controlled according to the rotations of the type wheel. The machine is adapted to take a master strip having one perforation or a plurality of perforations on a single transverse line. The perforations for the successive letters in a word in so far as they are found in the same order with respect to each other once around the type wheel, beginning from the initial position, may be placed in a single transverse line of the master strip and will be recognized in proper order by the machine in a single rotation of the type carrier. The several selecting levers corresponding to the various perforations in the line of perforations in position to coact with the levers will all drop into their perforations together, but as the stop cylinder rotates it will engage with the corresponding pawls in their proper order by reason of the disposition of the notches 38 upon the stop cylinder. The action of these parts will be hereinafter more fully explained. The type wheel turns intermittently under the control of the stop cylinder, and it is obvious that if several successive characters in the matter to be printed occur in the order set forth above, then the type wheel will be stopped several times in one revolution, but whether the order of occurrence is such as to give only one, or several characters in a rotation, the type wheel will eventually begin a new rotation, and at this time it becomes necessary to shift the master strip to bring a new line of perforations into operation. To effect this shift or feed of the master strip I provide a Geneva stop device, see Figs. 4 and 4ᵇ, consisting of a wheel 61 rigidly connected to cylinder 8 and provided with notches and locking faces and an actuator 62 provided with pin and locking face engaging in well known manner with the corresponding parts of member 61, said actuator being formed on the end of a sleeve or hollow shaft 63, (see Fig. 5ᵃ) loosely mounted on driving shaft 6 but having a frictional connection therewith so as to be rotated thereby except when held from such rotation by stop devices. This frictional connection may be of any suitable nature. I have shown for this purpose a U-spring 64, see Fig. 5ᵃ located in a suitable channel in shaft 6 and bearing against the inside of hollow shaft 63. Said shaft 63 carries near one end a cam 66, see Figs. 9 to 11 inclusive, which, in coöperation with a stop lever 67 pivoted on one end of stop cylinder 9, and an intermediate trip lever 68 pivoted at 69 to the frame 11, serves to control the operation both of the stop drum and the hollow shaft 63.

Cam 66 has a shoulder 70 adapted, when lever 68 is raised, to strike the end of said lever and stop the movement of said cam and its shaft as shown in Fig. 9, in normal position, that is, while the stop cylinder 9 is rotating to bring various type into position, the stop lever 67 is traveling around with it, being held against a pin 71 on the cylinder by a spring 72. But at the end of a rotation of the type wheel, that is when the blank or space therein approaches the printing point, the end of stop lever 67 strikes an inclined portion 73 of lever 68 (see Fig. 9) and falling back against a stop pin 74 depresses said lever 68 until its end is removed from engagement with shoulder 70 on cam 66, and thus releasing shaft 63 which begins to rotate. At the same time the stop cylinder 9 is stopped by the engagement of the stop lever 67 with a shoulder or tooth 75 at the end of the incline on the trip lever 68 (see Fig. 10). As the shaft 63 rotates the cam 66 rides over trip lever 68 and during the latter part of its rotation, depresses said trip lever so as to free the stop lever 67, whereupon said lever 67 is immediately returned to normal position against pin 71 by its spring 72 (see Fig. 11). Stop cylinder 9 is now free, so far as the above described stopping means is concerned, but it does not start to rotate until the release of certain locking means for the type wheel, as hereinafter described. Meanwhile the cam 66 completes its rotation and is brought to rest as before by its shoulder 70 engaging with the lever 68, the latter lever being at the shaft. A spring 19 presses disk 15 against the gear and thus causes frictional engagement of both disks with the gear, this engagement being rendered more smooth and regulable by means of cloth or felt bearing pads 20. The pressure of spring 19 may be regulated by nuts 21 screwing on the end of shaft 10. This frictional connection during rotation of gear 13 tends to impart a rotative movement to the shaft 10, while permitting the shaft with its type wheel to be arrested at any moment by suitable stop mechanism, the frictional connection aforesaid then slipping as the driving pulley continues to rotate. Any other frictional connection may be used to effect this result.

Master strip cylinder 8, see Figs. 1, 4 and 5, is mounted loosely on a fixed shaft 22, see Figs. 3 and 4, and the master strip 2 is passed over and around this cylinder, as indicated in dotted lines in Fig. 4, being guided by a guard or guide plate 23. Pegs or pins 24 arranged around the cylinder 8 at each end, Figs. 1, 4 and 5, enter the "sprocket holes" 4 of the master strip and feed it forward evenly as the cylinder is rotated. Selecting levers 26 are fulcrumed on a rod 25, said rod being supported by brackets 11—11, the free ends of said levers being guided by a comb 27. Each of the levers 26 is provided with a pin or nib 28 resting on the surface of the strip and adapted to enter the perforations therein, the cylinder 8 being provided with grooves or depressions 29 to accommodate the pins or nibs after they pass through the perforations in the strip. Annular grooves 30 in the cylinder 8 receive the ends of strippers 31 serving to strip the paper from said cylinder. The free ends of selecting levers 26 extend under the free ends of levers or pawls 32, these pawls being mounted on a rod 33 which engages their slotted bearings 34. This rod 33 is carried by arms 35 on a rocking shaft 36 pivoted in bearings secured to frame 1. The teeth 37 of pawls 32 are arranged to register with notches 38 in the stop cylinder 9, but the teeth are normally out of contact with same, but when any of the pawls fall by reason of the depression of the corresponding selecting levers 26, which depression will occur when any selecting lever encounters a perforation in the master strip, their teeth 37 will rest on the surface of the stop cylinder, and as the cylinder rotates in direction of the arrow, see Fig. 4, the teeth 37 will engage, in the proper order and at the proper time, as hereinafter more fully set forth, the notches 38 of the cylinder. These notches are arranged spirally on the cylinder, see Figs. 6 to 8, and for mechanical reasons I have arranged the notches in eight rows or series, each extending over one-eighth of the circumference of the cylinder. With this arrangement the stop levers which are sequentially in operative relation are not adjacent, the operation skipping seven levers at each step, but in a complete rotation of the stop cylinder a notch 38 is brought under each stop lever, although not into engagement therewith except when there is a corresponding perforation in the master strip. When any pawl 32 is engaged by a notch 38, the further rotation of the stop cylinder, which is in the direction of the arrow in Fig. 4, pushes such pawl backwardly, thus rocking the frame 35 and causing an arm 39 on rock shaft 36 of such frame to engage a pin 40 sliding in a guide 41 in the frame of bed 1. This movement of pin 40 is arrested by its shoulder or head 42 striking the guide 41, thus bringing the drum 9 and its shaft 10 to a stop. At the same time, the depression of pin 40 operates to release and bring into operation the impression and other mechanisms as hereinafter described. When any pawl 32 is pushed back as above described, the other pawls 32 are prevented from following the retreating frame rod 33, by means of springs 43 carried by a fixed bar 44 and engaging the rear ends of the respective pawls 32. Springs 43 are held from lateral displacement by a comb 45. Upward movement of pawls 32 and selecting levers 26 is limited by tails or arms 46 on pawls 32 engaging a cross bar 47 on base 1, which also furnishes a fulcrum whereby the springs 43 are enabled to press the pawls 32 downwardly as well as forwardly, and thus assist the action of gravity in depressing pawls 32, selecting levers 26 and the parts connected therewith.

The shifting mechanism for the type wheel comprises means adapted to cause a relative angular displacement of the type wheel and the stop cylinder, so as to bring the upper case into operative position in place of the lower case, the type wheel being provided with upper and lower case type, in alternate arrangement. The stop cylinder 9 is loose on its shaft, but is connected thereto by means shown in Figs. 6 and 6ª, consisting of an arm 48 fast on type wheel shaft 10, a sleeve 49 slidable on but rotating with said shaft 10 and carrying two arms 50, 51, on opposite sides of one head 52 of the stop cylinder. A pin 53 fixed on arm 50 extends through a hole in the arm 48 on shaft 10, so as to slide therein, and pins 54, 55 extend from the respective arms 50, 51 toward the head 52 and are adapted to engage in a hole 56 in said head, said pins 54, 55 being tapered on the end and offset or out of line with one another so that as the sleeve 49 is moved endwise and one pin, say 54, is withdrawn from the head while the other pin, 55, is caused to enter the head, the inclined end of the incoming pin will engage the edge of hole 56 and turn the stop cylinder through a small angle of the bevel wheels 173, 174, for reversing the travel of the paper carriage, and a reversing lever 178 (see Fig. 2) pivotally supported on frame 1, engages with the annular groove 179 in said collar, this mechanism being a well known form of reversing gear. Shaft 176 is connected to a shaft 180 and in direct line therewith by the coupling 181, the shaft 180 carrying the driving pinion 168 (Figs. 13—14) meshing with the carriage rack 107. The use of the coupling 181 is to permit the shafts 176 and 180 to have relative longitudinal movement while the carriage is moved forward and back while making impression. The pinion shafts 180 and 183 for driving pinion 168 and for the pinion 212 of the feed controlling mechanism are mounted in sleeves or tubular studs 109 on carrier 105.

Reversing lever 178 is controlled by the controlling mechanism in the following manner: Said lever, see Fig. 17, is connected to one arm of a bell-crank lever 185 by means of a rod 184, and the other arm of said lever 185 is pivotally connected to a sleeve 187, held on a shaft 188 by collars 186, said sleeve thus moving with the shaft longitudinally but permitting it to have an independent rotary motion. The shaft or rod 188, see Figs. 1 and 17, has an arm 189 with screw pin 190 so positioned as to be engaged by the end of the carriage 97 when the latter nears the end of its run. Said shaft 188 slides through a guide on frame 1 and carries an arm 191 loosely pivoted to a sliding bar 192, see Fig. 17, which is pivoted to frame 1 by a slot and pin support 193 allowing endwise as well as swinging movement to bar 192. A bar 194 pivoted to sliding bar 192 extends upwardly and carries a pin 195 engaging over a lever 200 similar to the selecting levers 26, this being the "line" lever, which is adapted to coöperate with the holes in the master strip marked "line" in Fig. 30. As said lever falls owing to the presence of a perforation beneath it, the bars 194 and 192 also drop, bar 192 resting on a guide, and a pin 196 on bar 192 is brought into the path of a pin 197 on a cam 198 fast on the hollow shaft 63. Consequently, when said shaft is turned, as above described, the pin 197 will push pin 196 and bar 192 back, and with them the arm 191 and shaft or rod 188, thereby throwing the reversing lever 178, so that the driving mechanism drives the carriage back to the beginning of the line. The carriage strikes the pin 190 on arm 189 and thereby, through rod 188 and arm 191, lifts bar 192 and disengages pin 196 from the pin 197, the cam 198 then continuing its rotation and finally operates, by a raised portion, a lever 199 pivoted to a fixed support, such lever then striking the arm 191 and pushing it back to normal position, thus throwing the reversing lever back, whereupon the carriage starts on a new run.

Means for turning the paper feed rolls for feeding from line to line are provided, consisting of a lever 202, (Figs. 2, 4 and 12) pivoted to frame 1 at 203 and engaging at one end with a cam 204 on shaft 116 and at the other end with a pin 205, sliding vertically through frame 1 and adapted when the carriage is at the beginning of its run to engage a lever 206 on the end of the carriage (Fig. 12$^a$) and lift said lever and thereby a rod 207 and connected to a pawl lever 208 whose pawl 209 engages with the feeding ratchet 210 of the upper feed roll 99, to feed the paper the required line distance. The feed of pawl 209 is controlled by stop 209$^a$.

The carriage feed controlling mechanism (Figs. 1, 2, 3, 12 and 17 to 29) comprises a shaft 183 carrying the pinion 212 which is driven by the carriage rack, another shaft 213 connected to shaft 183 by a clutch 214 similar to the one above described connecting shafts 180 and 176, and carrying a bevel wheel 215 (Fig. 18) engaging with a bevel wheel 216 fast on a sleeve 218 mounted on a shaft 219 journaled in bearings on frame 1. The sleeve 218 is loose on shaft 219 but connected thereto by a ratchet wheel 220 on the sleeve which engages a pawl 221 on an arm 222 carried by said shaft, so that the shaft will be rotated during the feeding movement of the carriage, while on the back movement of the carriage the pawl slips over the ratchet without operating the shaft. A lever 223 pivoted to base plate 1 has a lug 224 which engages a lug 225 on the carriage at the end of its back stroke, see Fig. 3, so as to throw the lever over and cause its opposite end to engage a pin 226 on bevel wheel 216, which through its connections 215, 213, 214, pinion 212 and rack 107 acts as the return stop for the carriage. As soon as the carriage begins to move in its next forward run, as described above, it releases lever 223, which is thrown out of engagement with pin 226 by means of spring 228. One function of the carriage feed controlling mechanism is to so control the feed that each letter will have the proper space allotted to it according to the width of the letter. For this purpose the arm 222, see Figs. 1 and 18, on shaft 219 coöperates with certain stop pins 229 arranged in a circular series in a ring 230 fixed on base plate 1, the operation of these pins being controlled by a feed controlling disk 231, (see Figs. 2, 4 and 4$^a$) mounted on a shaft 233 journaled in bearings beneath the base plate 1, and connected by gearing 234, 235, with the type wheel shaft 10. Said feed controlling disk 231 is a stop gage being provided at its periphery with elevated and depressed parts which correspond respectively with the unit values of the several type characters on the type carrier and act as stops for a feed controlling rod 236, the amount of depression of the periphery at any point corresponding to the amount of feed which is to be given for the corresponding type character, it being understood that gearing 234, 235 drives the disk 231 in exact conformity with the type carrier so that the depression corresponding to the type character brought to the impression point is presented to rod 236.

The rod 236 is withdrawn, for every feeding operation, from the disk 231, by means operated by the shaft 116 and consisting of a bell-crank 237 connected to said rod and carried by a rock shaft 238 mounted in bearings in base plate 1, and a lever 239 pivoted at 240 to a projection of plate 1, and having a pin-and-slot connection 241—242 with said bell-crank 237. Said lever 239 carries a roll 244 engaging with a cam 245, on shaft 116, a spring 246 (Fig. 2) operating to press the said lever 239 toward said cam and at the same time to turn shaft 238, and bell-crank 237, so as to move the rod 236 toward the controlling disk 231, the extent of such movement depending on the part of the periphery of disk 231 then opposite to the rod 236.

On the other end of rock shaft 238 is an arm 247 carrying a segment gear 248, engaging with a pinion 249, fixed on a sleeve 250, mounted to turn on a hollow stud 251, supported in fixed position on a bracket 252 on frame 1. A shaft 253 is journaled in said hollow stud and in a socket 254 in one end of shaft 219 (Fig. 23) and is movable longitudinally with reference to shaft 219 but forced to turn therewith by means of a coupling 255. Said shaft 253 carries an arm 260, adapted to operate the stop pins 229, which are supported and guided in the fixed ring 230. For convenience I make this fixed ring, as shown in Figs. 18 to 26, of an outer part 230 with a plain cylindrical bore, an intermediate ring 262 with a closed end 263 and with longitudinal grooves 264 in its periphery, and an inner ring 265, with peripheral longitudinal grooves 266 extending at one end, as indicated at 267, entirely through the ring 265. Ring 265 fits tight within ring 262 and the latter fits tight within ring 230, so as to form a ring structure with a head or dial 263 forming a bearing for one end of shaft 219 and with channels 264, 266, 267, receiving the stop pins 229 which are formed as U-springs (Fig. 28) with their arms extending respectively through the outer holes 264 and through the inner holes 266, 267 into the interior of the ring structure. The head 263 with stop pins 229 arranged around the same is in the nature of a dial. Arm 260 has at its outer end a T-shaped cross head 269 (Fig. 29) sliding longitudinally thereof and pressed outwardly by a spring 270, this head being guided in slot 271 and having a tooth 272 adapted to engage with the inner end of any one of the stop pins 229 when in proper position with respect thereto. A plate 274 fixed to end of ring 265 is provided with a toothed flange 276 (Fig. 27) having as many teeth as there are stop pins, and adapted to be engaged by a tooth 277 to properly position with respect to the stop pins the cross arm 278 fast on a sleeve 279 which is free to turn on shaft 253 and is moved longitudinally therewith. Said arm also carries a pin 280 adapted to enter any one of a series of holes 281 in the pinion 249, the number of such holes being equal to the number of stop pins 229, the engagement of said pin in said holes and of the tooth 277 in the toothed ring 276 being effected periodically as the sleeve 279 is moved longitudinally on the shaft in opposite directions. Such movement of sleeve 279 takes place when the shaft 253 is moved, by an arm 282 (Figs. 2 and 3) engaging with one end of said shaft at 283 so as to permit rotation of the shaft but to move the shaft longitudinally when the arm is moved, said arm being carried by a bar 284 sliding in guides 285 in the frame and carrying rolls 286 engaging on opposite sides of a disk cam 287 having a lateral wave or offset 288 adapted to impart a to and fro movement to the bar 284, arm 285, shaft 253 and sleeve 279.

Normally, that is, when the type wheel is being operated, the cross arm 278 is clutched to pinion 249 by pin 280 engaging in a hole 281 as shown in Fig. 18, and the shaft 219 is arrested by arm 222 engaging the stop pin 229, thus holding the carriage against the action of its driving means. The cross-arm 260 is then in position with respect to the stop pin 229 to hold it in position, and then to retract it at the proper time, as hereinafter explained. When the type wheel stops and the shaft 116 begins to rotate, the cam 245 on said shaft turns sufficiently to allow the feed controlling rod 236 to be moved under the influence of its spring 246 into contact with the periphery of the feed controlling disk 231, thereby, through segment gear 248 and pinion 249 turning the arm 278 through an angle depending on the part of the controlling disk then in action. The cam 287 then throws the shaft 253, sleeve 279 and cross arm 278 longitudinally, carrying said cross arm out of engagement with pinion 249 and into engagement with toothed ring 276, said cross arm in this movement striking the stop pin 229 which at that moment is opposite same and projecting it into the path of arm 222 on shaft 219. At the same time this endwise movement of shaft 253 slides the cross head 269 on arm 260 from under the inner end of stop pin 229 which has been resting against tooth 272 of same and the spring 270 of said cross head throws the head out so that it engages the stop pin as shown in Fig. 21. On the return endwise movement of the shaft 253, the cross head 269 draws the stop pin 229 with it (Fig. 22) so as to withdraw the outer end of said pin out of the path of stop arm 222 on shaft 219. Said shaft then rotates, allowing the carriage to advance a certain distance until the arm strikes the other stop pin 229 which has been projected into its path as above described. It is apparent that the travel of the carriage thus effected is determined by the angular movement of cross arm 278 and therefore is controlled by controller disk 231, which is arranged to rotate in harmony with the type carrier so that the part of the periphery in position to coact with the controlling rod 236 will limit its movement according to the feed required for the type then opposite the printing point. As the shaft 219 thus rotates it carries the shaft 253 and arm 260 around with it, the cross head on said arm snapping under the end of the stop pin which is now in position and preventing the back movement of the arm 260, and also of the stop arm 222 in case the carriage motion is reversed.

Spacing between words is controlled by a "space" selecting lever 290, Fig. 1, similar to selecting levers 26 and adapted to fall into perforations in the master strip marked "Space" in Fig. 30. When a word space perforation in the controller is encountered by the space selecting lever 290, the said lever falls and at the proper time its corresponding pawl, encountering its notch 38, gives back and releases the shaft 116 through the train of mechanism hereinbefore described. The notch in the stop cylinder is positioned so that a blank space on the type carrier is presented at this time and thus no impression is made although the carriage would be fed along and, as is obvious, a word space is thus obtained. The amount of carriage feed allowed in a word space is regulated and varied by means hereinafter to be described for the purpose of justifying the line.

The justifying operations are performed by means acting in conjunction with the above described feed controlling devices and are controlled by a perforated strip brought into action only when a "space" occurs in the matter to be printed.

The justifying strip (Fig. 31) has means for accurately feeding it forward to correspond with the movement of the other strip, said means being shown herein as sprocket holes 292. The strip has also justifying marks, perforations, or depressions, 293 arranged along the strip at different positions in its width, according to the amount of justification required. If there is no modification of the word space in order to effect the justification required the corresponding portion of the strip is blank and the word spacing will be normal.

The justifying mechanism, Figs. 2, 3, 15 and 16, comprises a drum 294 mounted loose on a shaft 295 supported on fixed bearings in side frames 296, said drum having sprocket pins 297 adapted to engage the sprocket holes 292 in the justifying strip; a strip guide 298 and stripper 299 being also provided. In connection with this description, attention is directed to Figs. 33, 34 and 35 and to the other figures mentioned. A toothed wheel 300 fast on drum 294, which drum feeds the justifying strip as hereinbefore pointed out, is engaged by a pawl 301 (Fig. 3) carried by an arm 302, on shaft 295 and is vibrated at each rotation of the impression shaft 116 by a cam 303 on said shaft 116 engaging an arm 305, (Fig. 2) on sleeve 306 mounted loose on the shaft 238 before mentioned, this sleeve 306 carrying also a lever 307 (Fig. 5) connected by rod 308 to a bell crank 309 (Figs. 15 and 16) pivoted on shaft 295, said bell crank 309 having its arm 310 adapted to engage the pawl arm 302, and move it so that its pawl 301 will engage a new tooth on wheel 300, when the lever 307 is vibrated through the rotation of shaft 116. The rod 308 is also pivotally connected to a bell crank 312 pivoted to frame 1 and provided with a spiral spring 313 tending to press rod 308 so as to hold arm 305 toward the cam 303 on the shaft 116. Spring 314 tends to draw pawl arm 302, with its pawl 301 so as to rotate wheel 300 and drum 294 to feed the tape forward, such movement of the pawl arm, however, being arrested by a screw stop 316 on frame 296. Said stop 316 also acts as a cam to cam pawl 301 into engagement closer with the toothed wheel 300 in order to prevent overfeed of the wheel. Spring 315 tends to hold pawl 301 in engagement with the toothed wheel 300. A detent 317 (Fig. 16) pivoted on a fixed rod 318 (Fig. 3) prevents back movement of toothed wheel 300, and a detent lever 319 is pivoted on the same rod 318 and is connected to detent 317 by a spring 320 (Figs. 2 and 5) tending to force both said pawls into engagement with the toothed wheel 300. Mounted on a head 321 (Fig. 5) on the upper end of said detent lever 319 is a sliding pin 322 carrying a disk head 323 (Fig. 16) adapted to be pressed toward the pawl lever head 321 by a spring 324 (Fig. 15) so as to be in the path of the upper end of bell crank 309, and to be pressed away from said pawl lever head by a pin 325 on an arm 326 pivoted at 327 to frame 1. The arm 326 is connected by a rod 328 to one arm of a bell crank lever 329 whose other arm is engaged by a pin 330 on the space controlling disk 231, said bell crank 329 being actuated by a spring 332 tending to force it into the path of said pin 330 and to hold the disk head 323 out of the path of lever 309, this being the normal condition of the parts. The first movement of arm 307 and rod 308, under the action of the shaft 116, serves to rock lever 309 and its arm 310 engaging the arm 302, retracts the pawl 301 one tooth, but the toothed wheel and drum are prevented from turning by the detents 317 and 319 which is in engagement with the toothed wheel. When the space selecting lever encounters a perforation in the controller and liberates shaft 116 as hereinbefore described, then the pin 330 operates to allow disk head 323 to be thrown by its spring 324 into the path of lever 309 so that as said lever moves under the action of spring 313 it will first throw the detent 319 out of toothed wheel 300 and the latter will be given a forward movement of one tooth under the action of spring 314 through the arm 302 and its pawl 301, stop 316 arresting the movement of arm 302 and its pawl 301. Thus the justifying strip is advanced one line at each word spacing operation.

A plurality, in this case, five, justifying levers 334 (Figs. 15 and 16) are pivoted side by side on a pivot rod or shaft 342, being guided in a comb 335 and pressed toward the drum 294 by springs 336 so as to cause their pins 337 to enter through the perforations in the justifying ribbon. A frame consisting of a rod 340 carried by side arms 341 on a rock shaft 342, extends under the justifying levers 334 and is operated by a beveled end 343 on one arm of bell crank 312, engaging a screw pin 344 on one of said side arms, so as to lift all the levers 334 out of contact with the justifying strip at each operation. A manually operated arm or device 345 with handle 346 and engaging with a portion 347 of said lifting frame, enables the justifying levers to be disengaged when desired.

The justifying levers 334 coöperate with a sliding rod 348 operated by the bell-crank 312 and arm 352 which is impelled by spring 354, so as to cause a collar 349 (Fig. 16ᵃ) on said rod to move beneath the justifying levers, said collar being normally free of said levers but adapted to strike any lever that has dropped through a perforation in the justification controller, thereby stopping the rod 348 in a corresponding position. One arm of bell crank lever 312 engages a shoulder 350 on one side of rod 348 (Fig. 16ᵃ) and also engages a pin 351 on a rock arm 352 pivoted on vertical pivot 353 and pressed toward the arm of bell crank 312 by a spring 354, said arm 352 engaging a shoulder 355 on rod 348. When the bell crank 312 is moved by its spring 313 on actuation of rod 308 by cam 303 on the shaft 116, its arm moves away from pin 351 on rock arm 352 and the rock arm follows it up, striking the shoulder 355 and moving rod 348 and collar 349. As soon as the bell crank begins this movement it releases the lifting frame 340, 341 and allows the justifying levers 294 to rest on the justifying strip, so that any lever which falls into a perforation will stand in the path of collar 349 and arrest the rod 348 after it has proceeded a greater or less distance—unless there is no hole presented, in which case all the levers will be supported by the tape out of the path of movement of the rod 348 and the rod 348 will move the maximum distance. The end of rod 348 is formed as a stepped head 356 capable of entering a deep slot 357 in the controlling disk 231 which is opposite the end of controlling rod 236 when the type wheel is at "blank" position. This stepped head 356 forms a variable interponent between the end of controlling rod 236 and the slot 357 and controls the movement of said rod in accordance with the particular step or stop presented to the end of rod 236. The deep slot 357 in disk 231 is a word space slot, its depth being varied by the interponent or stepped head 356 in accordance with the justification required. When the stepped head 356 enters said slot to the full width of said head, it will arrest the movement of rod 236 at such a point that the minimum feed for spacing will be given say, a three unit space, but if the first justifying lever is allowed to fall, the collar 349 will strike it so as to arrest rod 348 and thus position the stepped head 356 in slot 357 with the first stop in position to contact with rod 236, thereby permitting an additional unit of feed, and so on, each of the successive justifying levers, when permitted to drop by meeting a perforation, positions the rod 348 and its stepped head in a similar manner, each giving an additional unit of feed.

The operation of the apparatus is as follows: A master strip perforated in accordance with the characters to be printed and the word spacing, line-feeding, case shift and other requirements, independent of justification, and a justifying strip perforated in accordance with the justifying requirements, are placed on the respective strip cylinders—and the paper and ink requirements of the printing mechanism having been attended to, the machine is started and it will then proceed to print on the paper or other impression receiving surface, the printed matter determined by the master strip. Each time the master strip cylinder is turned to bring a new line of master strip into position, generally one or more of the selecting levers 26 with possibly one of the special or function controlling levers, will fall owing to presence of corresponding perforations in the master strip. The number of selecting levers 26 which will be allowed to fall will be determined by the number of perforations in the transverse line across the controller which is in the operative position. A controller may be used having in one such transverse line thereof as many characters occuring in sequence in a word as are found in the same relative order once around the type carrier counting from the initial point, it being understood that each transverse line of the master strip corresponds to one rotation of the type wheel. The falling of these levers stops the type wheel through the stop pawl 32 and stops cylinders 9, and it also causes the release of the impression mechanism, through the action of the frame carrying the stop pawls 32 and the mechanism connected with such frame, which may be termed universal mechanism. The operation of the impression mechanism then proceeds, the first action being to lock the type wheel, the next to actuate the impression mechanism which on its return movement feeds the carriage longitudinally, this feeding action being determined by the feed controlling mechanism as above described, proportionately to the width of the letter which is printed at that impression. The operation proceeds in this manner until the type wheel comes to the "blank" space and is ready to begin on a new rotation. Assuming that there is at this time no space punch in action, the type wheel is stopped by the cam and stop mechanism shown in Figs. 9 to 11 and the hollow shaft 63 operates through the Geneva stop mechanism to turn the master strip cylinder to bring a new line of the master strip into position. The impression mechanism is, however, not set in action, and as soon as the shaft 63 has completed its rotation it releases stop cylinder 9 and the type wheel proceeds as before, the stop cylinder engaging any pawls 32 which may have been brought into action by a new line of perforations on the master strip. If, however, a space perforation is in action when the type wheel comes to the blank, there is effected in addition to the above-described operation of shaft 63, a release of the impression mechanism by the corresponding stop pawl 32, but no impression is effected, as the type wheel presents a blank. If there is no justifying perforation in action, then the amount of carriage feed will be the normal word space, but if the justifying ribbon presents perforations representing units to be added to the normal space stepped head 356 on rod 348 will not be allowed to enter so deeply into the slot in the controlling disk 281, and the space will be governed according to the justification required.

For indenting the line as at the beginning of a paragraph, the controlling strip is provided with one or more perforations that give an initial feed of say, one, two or more standard word spaces, and the position of these perforations is such that there is no shifting or variation in the indent feed by the changes in justifying the rest of the line. Thus the machine, operating under the control of this strip, first feeds a certain distance, without regard to justification, and then in printing the rest of the line justifies it by variation of the word spaces included in the line and exclusive of the indent space.

The invention in its broader aspects is not limited to the specific mechanisms shown and described, nor to any specific form, but departures may be made therefrom within the scope of the accompanying claims, without departing from the principles of the invention and without sacrificing its chief advantages.

Claims.

1. An apparatus of the character described comprising a type carrier, selecting mechanism therefor, a justification mechanism, and a controlling device for the apparatus, said controlling device comprising two separate controllers, one of said controllers cooperating with the selecting means to select type characters and word spaces of a composition, and the other controller cooperating with the justification mechanism to vary the word spaces and justify the lines of the composition.

2. An apparatus of the character described comprising a justification mechanism and a separate independent controller cooperating with said justification mechanism to vary the normal word spacing.

3. An apparatus of the character described comprising a type carrier provided with a plurality of sets of faces of type, character selecting devices controlling the movement of the type carrier, a shift selecting device corresponding to the sets or faces of type, said shift selecting device modifying the movement of the type carrier as controlled by the character selecting devices to change the characters selected from one case or face to another.

4. An automatic typographic apparatus comprising a type carrier, a carriage for the impression receiving material, feed mechanism for the carriage, impression mechanism, a controlling device for the apparatus having a composition represented thereon, said controlling device comprising two separate controllers, one of said controllers controlling the operation of the type carrier, the impression mechanism and the carriage feeding mechanism to impress the type characters of said composition upon the impression receiving material and divide the same into words, the other controller controlling and coöperating with the carriage feeding mechanism to vary the normal word spaces to justify the lines of the impressions.

5. In an automatic typographic apparatus, the combination of a composing device independent of the apparatus and bearing representations of characters to be printed and word spaces, means for feeding said composing device through the apparatus, mechanism controlled by the composing device, means for indenting a line, and means for varying the word spaces without varying the indentation of the line, substantially as described.

6. In a typographic apparatus controlled by a composing strip or ribbon, a movable type carrier, a cylinder mounted to move with the type carrier, a series of coöperating levers corresponding to the type on the carrier and arranged to engage the cylinder and arrest the same, and a series of selecting devices controlling the engagement of the levers with the cylinder, substantially as set forth.

7. The combination of a type carrier, means for automatically positioning the same, means for applying the ink to the face of the type and distributing it thereon, with means for taking impressions of the type and means for dividing the impressions taken into words and lines, and means for justifying the lines, substantially as set forth.

8. An automatic typographic apparatus comprising a type carrier having a plurality of sets or faces of type, the characters of one set arranged adjacent the characters of another set, means automatically to select and position type normally from one of said sets of type and shift means to shift the type carrier from its normal positions to bring the corresponding type of another set to printing position.

9. An automatic typographic apparatus comprising a type carrier provided with a plurality of sets or faces of type, a composing device bearing character representations and shift representations, means controlled by the shift representations for selecting the particular set or face of type represented, character selecting means to select and bring to impression position the particular character represented, and means for removing the set or face of type previously selected.

10. In a typographic apparatus, mechanism controlled by a composing device to automatically select the type to be imprinted, and means independent of but coöperating with the composing device to regulate the word spaces and justify the lines, substantially as set forth.

11. An automatic typographic apparatus comprising means to receive a controller for automatically governing the operation of the apparatus, a type carrier, mechanism coöperating with the controller for automatically selecting the type characters represented on the controller, means for bringing the selected type to position, means for automatically taking an impression of the same, means for feeding the impression receiving surface a distance corresponding to the width of the impression made, means for dividing the impressions into words, and a separate and independently operating controller and mechanism coöperating therewith to regulate the word spaces and justify the line.

12. An automatic typographic apparatus comprising a composing device for controlling the same, a movable type carrier provided with a plurality of sets of type, mechanism controlled by the composing device to govern the movements of the type carrier and normally to cause the same to impress the type from one and the same set, mechanism controlled by the composing device to cause the type carrier to impress type from another of the sets, and means to restore automatically the normally acting type carrier governing mechanism to give impressions from the normal sets of type.

13. In a typographic apparatus, a composing device, a series of coöperating levers, a cylinder and type carrier controlled by said levers through the instrumentality of the composing device, a letter space mechanism consisting of a dial having movable pins, a notched disk, and coöperating mechanism, whereby one of a series of pins may be projected upon said dial to determine the letter space feed, substantially as set forth.

14. An automatic typographic apparatus comprising a type carrier having a plurality of sets of type, selecting means to select type from one or other of said sets, means for automatically changing the selection of type from one set to another, and a common means for selecting type from either set, substantially as set forth.

15. An automatic typographic apparatus comprising a type carrier, mechanism for selecting the type to be impressed, impression, spacing and line making mechanism, a common controller governing said mechanisms in combination with mechanism to regulate the word spaces to justify a line, and an independent controller governing said last named mechanism.

16. An automatic typographic apparatus comprising a type carrier, a carriage for impression-receiving material, impression mechanism, means for feeding the carriage to receive a line of impressions, a series of independently movable stops for controlling the feed of the carriage in accordance with the unit values of the characters and spaces in a line, selecting means for selecting said stops, and means for actuating and restoring the selected stops.

17. An automatic typographic apparatus comprising means to receive a composing device, a type carrier, impression mechanism, a carriage for the impression receiving material, means to feed said carriage along a line to receive the impressions, means for imparting to said carriage variable intermittent movements in one direction, and an uninterrupted movement to the extent of its travel in the opposite direction, a series of independently movable stops for determining the extents of the intermittent movements, and means for controlling and uniformly moving the mechanism in accordance with the variations of said stops, substantially as described.

18. An automatic typographic apparatus comprising means to receive a composing device to automatically control the same, a type carrier the characters of which are of different widths, a dial having a series of pins representing a variable letter space feed, and means for designating and executing a feed.

19. In an automatic typographic apparatus, a carriage feed controlling mechanism comprising a series of stop pins arranged in the form of a dial, an arm connected with the carriage feed mechanism and traveling over the face of the dial, means for selecting a pin representing the unit value of carriage feed movement required, and means for projecting the selected stop pin into the path of said arm and withdrawing the previously selected stop pin out of said path.

20. In an automatic typographic apparatus, a carriage for the impression-receiving material, mechanism for imparting a continuous line feed movement thereto, a feed controlling mechanism comprising a series of stop-pins and an arm connected with the line feed mechanism, a stop-pin selecting mechanism controlled by the unit values of the characters and spaces to be printed, and means automatically moved in one direction to project the selected stop pin into the path of said arm, and to free said arm from the previously projected stop-pin on its return movement.

21. In an automatic typographic apparatus, a carriage for the impression receiving material, mechanism for imparting a line feed movement to the same, mechanism for controlling said feed movement in accordance with the different unit values of the characters impressed and the normal and justified word spaces, said feed controlling mechanism comprising a series of stop-pins, an arm connected with the carriage feed mechanism, means to select automatically a stop-pin representing the unit value of an impressed character or of a word space, means to project the selected stop pin into the path of said arm, and means connected with said projecting means to engage the previously projected stop-pin to withdraw the same from the path of said arm.

22. An automatic typographic apparatus comprising means to receive a composing device to automatically control the same, a type carrier having type of different widths, a stop disk provided with stops of different depths corresponding to the widths of the types, and a stop representing the maximum word space width, and means for varying the depth of said stop, substantially as described.

23. An automatic typographic apparatus comprising a type carrier, the type characters of which are of different unit values, a carriage for impression receiving material, mechanism for imparting a continuous feed movement to the carriage, a series of stop pins controlling the amount of carriage feed movement, means to select a stop pin corresponding to the unit value of an impression character, and means to actuate said stop pin to control the feed movement of the carriage.

24. An automatic typographic apparatus comprising a rotary type carrier, means for actuating the same, selectively-operating means to arrest the carrier in position to give type impressions, rotary ink applying and distributing devices, a traveling carriage for impression receiving material, feeding mechanism for said carriage imparting a continuous movement thereto along the line of impressions, means to intermit said movement in accordance with the unit values of the characters and spaces forming the justified line of impressions, and an impression mechanism to bring the type and impression receiving material into contact.

25. An automatic typographic apparatus comprising a controller for automatically governing the operation of the apparatus and means to feed the controller therethrough, a carriage for the impression receiving material, means for imparting longitudinal movement to said carriage in accordance with the unit values of the printed characters and spaces, and means for giving said carriage a movement transverse to the first-named movement to execute an impression.

26. An automatic typographic apparatus comprising a type carrier, means for moving the same, means for automatically selecting and positioning the type, a carriage for the impression receiving material and means for imparting to said carriage a variable intermittent movement after each type impression is made, and means for imparting to said carriage a uniform reciprocating movement transversely of the line of travel for the purpose of making the impressions.

27. An automatic typographic apparatus comprising a type carrier, means for moving the same, means for automatically selecting and positioning the type, means for locking the carrier in position, a carriage for the impression receiving material, means for imparting to the said carriage a variable intermittent movement after each type impression is taken, means for imparting to said carriage a uniform reciprocating movement transversely of the line of travel for the purpose of making the impression, and means for unlocking the type carrier after the impression has been taken.

28. An automatic typographic apparatus comprising a rotary type carrier, means tending constantly to drive the same and means for automatically releasing and arresting the same, said arresting means operating to bring the type to impression position, means for taking an impression of the type brought to position, means for locking the carrier prior to and while taking the impression, and means for operating the releasing means when the impression has been taken.

29. An automatic typographic apparatus comprising means to receive a composing device, a series of coöperating levers, a cylinder controlled by a second series of levers which are rendered operative by the levers which coöperate with the composing device, substantially as set forth.

30. An automatic typographic apparatus comprising means to receive a composing strip or ribbon, a type carrier, a series of selecting devices corresponding to the type on the type carrier, means to actuate simultaneously all those selecting devices which correspond to type characters occurring consecutively in the matter being printed and which follow the same order of arrangement as the types on the type carrier, and means to impress the selected type characters successively upon a suitable receiving surface.

31. An automatic typographic apparatus comprising a carrier bearing type from which impressions are to be taken, a controller having character representations therein in the order of composition and so arranged that one or a plurality of characters on the type carrier will be selected by the controller at each movement thereof, according as the order of character representations on the controller follows the order of arrangement of type on the carrier.

32. An automatic typographic apparatus comprising means to receive a composing strip or ribbon, a type carrier, a movable carriage for the impression receiving material, a series of selecting devices corresponding to the characters on the type carrier and including selecting devices for the word spaces and line endings of the matter being printed, means whereby the several selecting devices may be actuated simultaneously, and means actuated by the selecting device corresponding to the line-ending to return the carriage to its starting point.

33. An automatic typographic apparatus comprising means to receive a composing strip or ribbon, a progressively moved type carrier, a series of stop devices for said type carrier and corresponding to the characters thereon, and selecting means for the stop devices actuated by the composing strip whereby the type carrier is arrested in position to print the character corresponding to the selected stop device.

34. An automatic typographic apparatus comprising means to receive a composing strip or ribbon, a movable type carrier, a series of stop devices therefor, means actuated by the composing strip to select and actuate the stop devices, an impression mechanism, and means actuated by any of the said stop devices to operate the impression mechanism.

35. An automatic typographic apparatus comprising means to receive a composing strip or ribbon, a movable type carrier, stop devices therefor actuated by the composing strip, impression mechanism, a carriage for an impression receiving surface, and means actuated by a stop device to operate the impression mechanism and to move progressively the said carriage after each impression operation.

36. An automatic typographic apparatus comprising means to receive a composing strip or ribbon, a movable type carrier, stop device therefor actuated by the composing strip, impression mechanism, a carriage for an impression receiving surface, and means actuated by a stop device to operate the impression mechanism and to move the said carriage progressively and by an amount corresponding to the space-unit value of the succeeding type character or space, after each impression operation.

37. An automatic typographic apparatus comprising means to receive a composing strip or ribbon, a progressively moving type carrier, a stop mechanism to arrest said carrier to present its type to an impression point, a series of selecting levers controlling said stop mechanism and provided with means to engage the various controlling marks on the controller, means to raise automatically the selecting levers out of engagement with the controller after all the controlling marks in a single transverse line thereof have accomplished their functions in the machine, and means to feed the controller automatically forward to bring its next transverse line of marks into engagement with the selecting levers.

38. An automatic typographic apparatus comprising a type carrier, a carriage for impression receiving material, driving mechanism for said carriage, a series of independently movable stops representing unit values of spacing, means for projecting and withdrawing said stops, selective mechanism for said stops operated in acordance with the unit values of the characters and spaces in the composition, said stops controlling the movements of the carriage in acordance with the unit values of the characters and spaces in the composition.

39. An automatic typographic apparatus comprising means to receive a composing strip or ribbon, a progressively moving type carrier, stop means controlled by the strip to arrest the movement of the type carrier, impression mechanism to take type impressions when the carrier is in arrested position, and means controlled by the movement of the carrier to feed forward the controlling strip when the type carrier has completed a cycle of movement and returned to normal position.

40. An automatic typographic apparatus comprising means to receive a composing device, a type carrier, a carriage to support impression receiving material, driving mechanism to move said carriage progressively past the type carrier, means to arrest the carriage, and means operated by the carriage driving mechanism on the arrest of the carriage to move the same into impression contact with the type on the type carrier.

41. An automatic typographic apparatus comprising a type carrier, a carriage for impression receiving material, driving mechanism for said carriage, a series of independently movable stops representing unit values of spacing, selective mechanism for said stops operated in accordance with the unit values of the characters and spaces in the composition, said stops controlling the movements of the carriage in accordance with the unit values of the characters and spaces of the composition.

42. An automatic typographic apparatus comprising means to receive a composing strip or ribbon, means to feed the composing strip intermittently through the machine, a moving type carrier, and automatic means to lock the type carrier during the feed of the composing strip.

43. An automatic typographic apparatus comprising a type carrier, ink applying and distributing devices for applying and distributing ink upon the face of the type, means for automatically selecting the characters to be impressed, means for bringing the carrier to rest while imprinting a character, impression mechanism and means for bringing the same into action upon the stopping of the type carrier, and means to automatically release the carrier when an impression has been made, substantially as set forth.

44. An automatic typographic apparatus comprising means to receive a composing strip or ribbon, means to feed the composing strip intermittently through the machine, a moving type carrier, and manually-operated means to lock the type carrier and disconnect the strip-feeding means from its operating mechanism.

45. An automatic typographic apparatus comprising means to receive a composing device, a carriage to support impression receiving material, carriage driving mechanism to move said carriage progressively past the type, reversing gear for said carriage driving mechanism, and selecting means controlled by the composing strip to actuate the reversing mechanism.

46. An automatic typographic apparatus comprising means to receive a composing strip or ribbon, a carriage to support an impression receiving material, mechanism to move said carriage progressively past the type, means to return the carriage to its starting point, feed mechanism on said carriage to feed forward the impression receiving material, and means automatically operated on the return of the carriage to its starting point to actuate the said feeding means.

47. In an apparatus of the character described, mechanism for feeding a controller intermittently through the apparatus, a series of selecting means arranged to engage typographic representations in the controller, a type carrier, stop devices for the same selectively controlled by the selecting means, and impression mechanism controlled by the action of the stop devices.

48. In an apparatus of the character described, a series of selecting means arranged to engage typographic representations in the controller mechanism for feeding said controller step by step through the apparatus to bring a transverse line of the representations in engagement with the selecting means at each step, a type carrier, stop devices for the same selectively controlled by the selecting means, and impression mechanism controlled by the selecting means.

49. In an apparatus of the character described, mechanism for feeding a controller therethrough, a series of selecting means arranged to engage simultaneously the typographic representations in each transverse line of the controller, a constantly driven type carrier, stop devices for the same selectively controlled by the selecting means, impression mechanism controlled by said stop devices, and means for actuating the controller feeding mechanism on the type carrier completing each cycle of movement, whereby a new transverse line of typographic representations on the controller is brought into position to be engaged by the series of selecting means.

50. In an apparatus of the character described, mechanism for feeding a controller therethrough, a series of selecting means arranged to engage simultaneously the typographic representations in each transverse line of the controller, a constantly driven type carrier, stop devices for the same selectively controlled by the selecting means, impression mechanism controlled by said stop devices, means for automatically removing the selecting means from engagement with the controller, and means for actuating the controller feeding mechanism on the type carrier completing each cycle of movement, whereby a new transverse line of typographic representations on the controller is brought into position to be engaged by the series of selecting means.

51. In an apparatus of the character described, mechanism for feeding a controller through the apparatus, a series of selecting devices arranged to engage typographic representations in the controller, a type carrier, stop devices selectively controlled by the selecting devices and controlling the movements of the type carrier, a carriage for impression receiving material, driving means therefor and impression mechanism, said carriage driving means and impression mechanism controlled by the stop devices.

52. In an apparatus of the character described, mechanism for feeding a controller through the apparatus, a type carrier, a stop-cylinder connected to move with the type carrier, means constantly to drive the stop-cylinder, a series of selecting devices arranged to engage the typographic representations on the controller, a series of stop-levers corresponding to and controlled by the selecting devices, said stop-levers having means to engage the stops of the stop-cylinder, and impression mechanism controlled by the stop-levers.

53. In an apparatus of the character described, mechanism for feeding a controller through the apparatus, a type carrier, a stop-cylinder connected to move with the type carrier, means constantly to drive said stop-cylinder, a series of stops successively arranged on said stop-cylinder in the direction of its movements, said stops corresponding to the type on the carrier, a series of selecting devices arranged to engage simultaneously a plurality of typographic representations on the controller, a corresponding series of stop-levers having means for engaging the stops on the stop-cylinder, said stop-levers controlled by the selecting devices and successively engaging said stops, and impression mechanism controlled by the stop-levers.

54. In an apparatus of the character described, intermittently operating mechanism for feeding a controller through the apparatus, a type carrier, means for moving the same progressively through a series of cycles of movement, and connections between the type-carrier moving means and the controller feeding mechanism to operate said feeding mechanism on the type carrier completing each cycle of movement.

55. In an apparatus of the character described, intermittently operating mechanism for feeding a controller through the apparatus, a type carrier, means for moving the same progressively through a series of cycles of movement, connections between the type-carrier moving means and the controller feeding mechanism to operate said feeding mechanism on the type carrier completing each cycle of movement, locking means for the type carrier, and means to operate the same when the controller feed mechanism is operated.

56. In an apparatus of the character described, intermittently operating mechanism for feeding a controller through the apparatus, a type carrier, means for moving the same progressively through a series of cycles of movement, connections between the type-carrier moving means and the controller feeding mechanism to operate said feeding mechanism on the type carrier completing each cycle of movement, a series of selecting devices arranged to engage the typographic representations on the controller, a corresponding series of stop devices selectively controlled by the selecting devices to arrest the type carrier, locking means to lock the type carrier in its arrested positions, and means to operate and release the locking means, said locking and releasing means controlled by the stop devices.

57. In an apparatus of the character described, mechanism for feeding a controller through the apparatus, a series of selecting devices arranged to engage typographic representations on the controller, a type carrier and means for operating the same, a series of stop devices for arresting the type carrier, locking means to lock the type carrier in arrested position, and impression mechanism, said locking means and impression mechanism controlled by the stop devices.

58. In an apparatus of the character described, mechanism for feeding a controller through the apparatus, a constantly driven type carrier, a series of selecting devices corresponding to the type on the carrier, a series of stop devices also corresponding to the type on the carrier, said stop devices selectively controlled by the selecting devices to arrest the type corresponding to the selected devices in impression position, and impression mechanism controlled by the stop devices.

59. In an apparatus of the character described, mechanism for feeding a controller through the apparatus, a type carrier and means to move the same through repeated cycles of movement, a cylinder provided with a series of stops corresponding to the type on the carrier and moving with the type carrier, a series of stop devices to engage said stops and arrest the type carrier, a series of selecting devices arranged to engage typographic representations on the controller and controlling the said stop devices, and automatically-operated means to restore the actuated stop devices to normal position on the completion of each cycle of movement of the type carrier.

60. In an apparatus of the character described, mechanism for feeding a controller through the apparatus, a type carrier and means to drive the same, a series of selecting devices corresponding to the type on the carrier and arranged to engage typographic representations on the controller, and manually-operated means to disengage simultaneously the selecting devices from the controller.

61. In an apparatus of the character described, mechanism for feeding a controller through the apparatus, a selecting device arranged to engage word-space representations on the controller, and automatic justification mechanism having its operation dependent upon the operation of the word-space selecting device.

62. In an apparatus of the character described, mechanism for feeding a controller through said apparatus, a selecting device arranged to engage word-space representations on the controller, justification mechanism comprising means for feeding a justification controller therethrough, said feeding means for the justification controller actuated by the operation of the word-space selecting device.

63. In an apparatus of the character described, a type carrier, mechanism for making impressions from the type on the carrier, a traveling carriage for the impression-receiving material and means to drive the same, justification mechanism comprising means to feed a justification controller therethrough, a series of selecting devices arranged to engage justification representations on the controller, and means controlled by said selecting devices to govern the movement of the carriage.

64. In an apparatus of the character described, a type carrier, mechanism for making impressions from the type on the carrier, a traveling carriage for the impression-receiving material and means to drive the same, justification mechanism comprising means to feed a justification controller therethrough, a series of selecting devices arranged to engage justification representations on the controller, said selecting devices representing units of justification, a stop device controlling the movement of the carriage having stops corresponding to the several selecting devices, said stop device operated by the carriage driving means and having its movement controlled by the selecting devices.

65. In an apparatus of the character described, mechanism for feeding a controller through the apparatus, a selecting device arranged to engage word-space representations on the controller, justification mechanism comprising means to feed a justification controller therethrough, a series of selecting devices arranged to engage justification representations in the justification controller, said selecting devices normally held out of engagement with the justification controller, means operated by the word-space selecting device to cause said selecting devices to engage said controller.

66. In an apparatus of the character described, justification mechanism comprising means for feeding an independent justification controller therethrough, a series of selecting devices arranged to engage justification representations on the controller, and manually-operated means to raise the selecting devices out of engagement with the controller.

67. In an apparatus of the character described, mechanism for feeding a controller through the apparatus, a type carrier, a unit value stop gage, means for moving said gage and carrier in unison, a blank portion on said type carrier and a corresponding word-space stop in said gage, automatic means to arrest the carrier and gage with said blank portion and word-space stop in operative position, justification mechanism comprising mechanism to feed a justification controller therethrough, detent means for said feeding mechanism, means on the unit-value stop gage to release said detent means when the word-space stop comes into operative position.

68. In an apparatus of the character described, mechanism for feeding a controller through the apparatus, a word-space selecting device arranged to engage word-space representations on the controller, a unit value stop gage having a word-space stop thereon, automatic means to arrest said stop in operative position, justification mechanism comprising means to feed a justification controller therethrough, a series of selecting devices selectively operated by the justification controller, a variable interponent coöperating with the word-space stop of the stop gage, said interponent controlled by the said selecting devices and operated by the action of the word-space selecting device.

69. In an apparatus of the character described, a unit-value stop gage, a word-space stop therein, justification mechanism controlled by a justification controller, and means to vary the unit value of said word space stop in accordance with the justification represented on the controller.

70. In an apparatus of the character described, means to receive a controller therefor, a type carrier, a series of type arranged on the same with a blank space at the beginning and end of the series, means to move said carrier progressively through its series, mechanism selectively controlled by the controller to arrest said carrier in position to give impressions of its type, and automatic means to arrest said type carrier with its blank space at impression position at each completion of the series.

71. In an apparatus of the character described, a rotary carrier having a series of type arranged on its periphery, means to rotate said carrier constantly in one direction, a blank space on the periphery of said carrier, an automatic stop device connected to rotate in unison with said carrier to arrest the carrier with the blank space in impression position in each rotation thereof, a rotary feed drum for feeding a controller through the apparatus, driving mechanism having connections to said stop device and feed drum, stop mechanism with coöperating members connected with said driving mechanism and feed drum respectively, said stop mechanism operating to hold the feed drum stationary during rotation of the type carrier and to allow rotation of the feed drum when the type carrier is arrested.

72. In an apparatus of the character described, a driving shaft, a shaft having driving connection therewith and having a type carrier mounted thereon, a friction clutch on said type-carrier shaft between its driving connection and the type carrier, a stop lever carried by said type-carrier shaft, a trip lever mounted to be engaged by said stop lever to arrest the same and its shaft, a cam frictionally connected with the driving shaft and arranged to engage the trip lever, said cam having a stop shoulder coöperating with the trip lever to be arrested thereby, a cam shoulder on the trip lever engaged by said stop lever, all said cams, shoulders and stops mutually coöperating with the trip lever to arrest the type-carrier shaft during the movement of the cam and to arrest the cam during rotation of the type-carrier shaft.

73. In an apparatus of the character described, a type carrier having a plurality of sets of type arranged thereon with the type of one set alternating with the corresponding type of the other set, selecting devices for normally selecting type from one and the same set, stop devices for arresting the carrier with the selecting type in impression position, and a shift device for shifting the position of the stop devices whereby the carrier is arrested with the corresponding type from the other set in impression position.

74. In an apparatus of the character described, a rotary type carrier having a plurality of sets of type on its periphery with the type of one set alternating with the corresponding type of the other set, a stop cylinder mounted to rotate in unison with the type carrier and having a series of stops thereon corresponding to either of the sets of type on the carrier, selectively controlled means to engage said stops and arrest the type carrier with the selected type in impression position, and shift means to shift said stop cylinder from a position representing one set of type to a position representing the other set of type.

75. In an apparatus of the character described, a type carrier having a plurality of similarly arranged sets of type thereon, a series of stops representing the type characters of one set of type and correspondingly arranged with the type on the carrier, means to move said stops and type carrier in unison, selectively controlled devices to engage the stops and arrest the type carrier with the type corresponding to the engaged stop in impression position, and automatic means to shift said stops relatively to the type carrier whereby the stops correspond interchangeably to each of the sets of type on the carrier.

76. In an apparatus of the character described, a type carrier having a plurality of similarly arranged sets of type thereon, a series of stops representing the type characters of one set of type and arranged correspondingly with the type on the carrier, said stops normally representing the characters in one of said sets of type on the carrier, means to move said carrier and stops in unison, selectively controlled devices to engage said stops and arrest the type carrier with the type corresponding to the engaged stop in impression position, automatic shift means to shift said stops relatively to the carrier, to represent another of the sets of type, and automatic means to restore said stops to their normal representation.

77. In an apparatus of the character described, a type carrier having a plurality of sets of type on its periphery the type of one set alternating with the corresponding type of another set, a shaft on which said type carrier is mounted to rotate therewith, a cylinder provided with a series of stops corresponding to the type of one of the sets on the carrier, said cylinder loosely mounted on said shaft, an arm fast on said shaft, a cam sleeve slidably mounted on said shaft, a pair of arms carried by said sleeve one on each side of a head of said cylinder, a pin caried by each of said arms to engage an aperture in said head, said pins angularly displaced by an amount equivalent to the space between adjacent types on the carrier, one of said pair of arms normally engaged with the cylinder head and having slidable connection with the arm which is fast on the shaft, means to drive said shaft, selectively operated stop devices to engage the stops and arrest the type carrier in impression positions corresponding to the engaged stops, a shift device having means to engage the cam of said cam sleeve, whereby said sleeve is moved longitudnally to disengage the normally engaged arm and engage the other arm by its angularly displaced pin with the cylinder to bring the stops of said cylinder in correspondence with another set of type.

78. In an apparatus of the character described, a type carrier, the type of which are of different unit values, a stop device provided with stops corresponding to the types on the carrier and representing their respective unit values, selectively controlled means to bring the selected type to impression position, means to bring the stop corresponding to the selected type simultaneously to operative position, a carriage for impression receiving material, feed mechanism for said carriage to feed the same adjacent the type carrier, a feed controlling device operated by said feed mechanism and arranged to engage the stops of said stop device when brought to operative position, and impression mechanism to impress the type upon the material carried by the carriage.

79. In an apparatus of the character described, a rotary type carrier having type on its periphery, said type having different unit values, a disk having a series of notches on its periphery, said notches corresponding to the type on the carrier and representing their respective unit values, means to rotate said carrier and disk in unison, selectively operated means to arrest said carrier and disk with the selected type and its corresponding notch in operative position to give an impression, a carriage for impression-receiving material, feeding mechanism for said carriage to feed the same adjacent the type carrier, a feed controlling rod actuated by said carriage feeding mechanism and having a portion to engage the notches on the disk, and impression mechanism to impress the type upon the material carried by said carriage.

80. An apparatus of the character described comprising means to receive a composing device, selective devices controlled by said composing device, stop devices controlled by said selective devices, a type carrier controlled by said selective devices, a carriage for impression-receiving material, feeding mechanism for said carriage, controlling means for said feeding mechanism, reversing mechanism for said feed mechanism, justification mechanism governing said feed controlling means, and impression mechanism for impressing said type upon the material carried by said carriage, a driving shaft controlled by said stop devices and operating the carriage feeding and reversing mechanism, the carriage feed controlling means, the justification mechanism and the impression mechanism.

81. In an automatic typographic apparatus, a rotary type carrier provided with type, rotary ink applying and distributing means for applying and distributing ink upon the faces of the type, a composing device representing the subject-matter to be printed, means coöperating with the composing device for selecting the characters of the subject-matter represented, and means for impressing the selected characters and dividing the subject-matter into a series of justified lines, substantially as set forth.

82. In an automatic typographic apparatus, a controller adapted to position the letters and characters forming a given composition at the point of impression, means for feeding the controller through the apparatus, mechanism coöperating with the controller to imprint the letters and characters when they have been positioned, mechanism adapted to remove the letter or character from which an impression has been taken, and mechanism to position the next succeeding letter or character called for in the composition, and mechanism adapted to feed the impressed letter or character a space corresponding with the unit value of such letter or character, and mechanism to justify lines intended to be of uniform length, substantially as set forth.

83. In a pattern-controlled printing-machine, a pattern-feeding mechanism, printing, inking and impression-taking mechanisms, and a paper carrying traveling carriage, in combination with means controlled by the pattern for automatically stopping the machine at the conclusion of a printed line, means for automatically returning the carriage to initial position, and means for automatically moving the paper for the printing of a new line.

84. In a pattern-controlled printing-machine, a type-bearing cylinder, means for moving the cylinder to a desired position, and means operated by a pattern to control the movements of the cylinder, in combination with means for taking impressions from the type of the cylinder, and with means for rendering the impression-taking means ineffective at certain portions of the pattern, substantially as described.

85. In a pattern-controlled printing-machine, a pattern-feeding mechanism, a type-bearing cylinder, means controlled by the pattern for positioning the cylinder as desired, means for locking the positioned cylinder, inking mechanism, means for taking impressions from the inked cylinder and a paper-carrying traveling-carriage, substantially as described.

86. In a pattern-controlled printing-machine, a pattern-mechanism, a type-bearing cylinder, means controlled by the pattern-mechanism for positioning the cylinder as desired, means for locking the positioned cylinder, inking mechanism, means for taking impressions from the inked cylinder, a paper-carrying traveling-carriage, and means controlled by the pattern-mechanism for regulating the travel of the carriage, substantially as described.

87. In a pattern-controlled printing-machine, pattern mechanism, character selecting means controlled by the pattern-mechanism, printing, inking and impression-taking means, a paper-carrying carriage and connections for driving the same, means controlled by the pattern-mechanism for regulating the movements of the carriage-driving connections, means, controlled by the pattern-mechanism, for stopping the machine at the conclusion of a line, and means, controlled by the pattern-mechanism for restoring the carriage to initial position, substantially as described.

88. In a pattern-controlled printing-machine, a pattern-mechanism, a printing mechanism controlled thereby, a paper-carrying traveling-carriage, means for moving the carriage a number of units in accordance with the units-width of the character selected, and means for varying the unit of travel of the carriage according to the font of type employed by the printing-mechanism, substantially as described.

89. In a pattern-controlled printing-machine, a pattern-feeding mechanism, a type-bearing cylinder having characters of different units-width, means for taking impressions from the characters on the cylinder, and means, controlled by the pattern, for moving the paper a number of units corresponding to the width of the impressed character, substantially as described.

90. In a pattern-controlled printing-machine, a pattern-feeding mechanism, a printing mechanism controlled by the pattern, a paper-carrying traveling-carriage, and means, also controlled by the pattern, for moving the carriage a number of units in accordance with the units-width of the character selected, substantially as described.

91. In a pattern-controlled printing-machine, a pattern-feeding mechanism, a type-bearing cylinder, means controlled by the pattern for moving the cylinder, to present the desired characters at a printing point, inking means, a paper-carrying traveling-carriage, means controlled by the pattern for moving the carriage a number of units in accordance with the units-width of the characters selected, means for inking the type and means for taking an impression therefrom upon the paper of the carriage, substantially as described.

92. In a pattern-controlled printing-machine, means to receive a composing strip or ribbon, a type-carrier, inking means and impression-taking means, in combination with means, controlled by said strip or ribbon, for positioning the type-carrier as desired, means, controlled by said strip or ribbon, for justifying the lines of impressions taken from said type-carrier, and means for rendering the impression-taking means inoperative at interword spaces of the printed line, substantially as described.

93. An automatic typographic apparatus comprising a receiving and feeding means for a controller, and means adapted to coöperate with and be controlled by the controller to print a plurality of characters under the control of a single feed movement of said controller.

94. An automatic typographic apparatus adapted to operate under the control of a controller having character and justifying perforations arranged in transverse lines, said apparatus comprising selective means operating under the control of the perforations on a single transverse line to print selectively a plurality of characters and to justify the printed matter.

95. An automatic typographic apparatus adapted to be controlled by a controller having character perforations therein arranged in transverse lines thereof, certain of said transverse lines containing a plurality of character perforations, means controlled by the perforations in any transverse line to make those character impressions successively which are represented by the perforations in such line, and means to feed the controller to bring the transverse lines of perforations successively into controlling position.

96. An automatic typographic apparatus adapted to be controlled by a controller having perforations therein representing typographic characters normal word spaces, and justification values, said apparatus having selective means coöperating simultaneously with the controller to select the characters, spaces and justification values represented by the perforations therein, and impression, spacing and justifying means operating under the control of the controller.

97. An automatic typographic apparatus adapted to be controlled by a controller having perforations therein representing typographic characters normal word spaces, and justification values, said apparatus having selective means coöperating simultaneously with the controller to select the characters, spaces and justification values and to shift from one type face to another, and impression means operating under the control of the controller.

98. An automatic typographic apparatus having a rotary type carrier, means for receiving and feeding a controller having a plurality of character-representing perforations arranged in transverse lines thereof, selective means controlled by said controller operating under the controller of the perforations in a transverse line to release the type carrier, arrest the same at a plurality of points in a single rotation corresponding to the successively selected characters, means for making an impression at each arrest, and means operated on completion of rotation of the type carrier to control the strip-feeding means and advance the strip.

99. The combination of a type carrier, means for automatically positioning the same, means for applying the ink to the face of the type, means for taking impressions of the type, means for dividing the impressions taken into words and lines, and means for justifying the lines.

100. A typographic machine having in combination a type carrier, means for automatically positioning the same, means for applying ink to the face of the type, means for taking impressions of the type, means for spacing between words, and means for modifying the word spaces to justify the line.

101. A typographic machine having in combination a type carrier, means for automatically positioning the same, means for applying ink to the face of the type, means for supporting an impression-receiving material, means for making the impression, means for causing relative movement of the type carrier and impression-receiving material for character and interverbal spacing, and means for modifying the interverbal spacing to justify the line.

102. An automatic typographic machine, adapted to be controlled by a controller having marks indicating characters, functions and justification values, the combination of a type carrier adapted to be positioned by said controller, inking mechanism coacting with said type carrier, means for bringing an impression-receiving surface into impression contact with the type, means controlled by the controller for spacing between words and means, also controlled by the controller, for modifying the word spaces to justify the line.

103. The combination with a type carrier and its driving means, of selective arresting means for the type carrier, and impression means controlled by the arrest of the type carrier.

104. A typographic machine including in combination character impressing means, an automatic controller strip having character indications, means coöperating with said controller and with said character impressing means to select characters in accordance with the indications of the controller, a carriage for the impression receiving material, and means for positively advancing said carriage a letter-width at a time.

105. A typographic machine including in combination character impressing means, a controller having character indications, a carriage for the impression receiving material, a constantly driven power shaft, driving connections for said carriage, a friction clutch between said carriage and said shaft and settable means set by said controller for determining the amount of travel of said carriage for successive impressions.

106. A typographic machine including in combination character impressing means, a controller having character indications, a carriage for the impression receiving material, a constantly driven power shaft, driving connections for said carriage and a friction clutch between said carriage and said shaft, means for permitting said carriage to be intermittently driven by said shaft through said clutch and settable means set by said controller for determining the amount of travel of said carriage for successive impressions.

107. A typographic machine including in combination rotary character impressing means, a carriage for the impression receiving material, continuously rotating means tending to continuously progress said carriage, and rotary means acting to alternately prevent and permit said progression.

108. A typographic machine including in combination a type carrier having mounted thereon types of different widths, an automatic controller coöperating with said type carrier to select the type to be impressed, a carriage for the impression receiving material, means tending to continuously progress said carriage, and means for permitting and preventing such progress and limiting same to a distance corresponding to the width of the next character to be printed.

109. A typographic machine including in combination means for presenting types of various width for impression, a carriage for the impression receiving material, means tending to continuously progress said carriage, means for permitting and preventing such progress and limiting same to a distance corresponding to the width of the next character to be printed and means for causing said progressing means to progress the carriage in either direction.

110. A typographic machine including in combination, a controller strip, character selecting means controlled by said controller, a carriage for the impression receiving material, and means controlled by said controller for giving a variable feed to said carriage corresponding to the width of the character selected.

111. A typographic machine adapted to be controlled by a controller including in combination a type carrier, a carriage for the impression receiving material, settable means for controlling the letter feed movement of said carriage to correspond to the type to be printed, a controller for selecting the types and setting said settable means and a separate controller for setting said settable means for the interverbal spaces.

112. A typographic machine including in combination character selecting means, a carriage for the impression receiving material, a continuously driven shaft, connections from said shaft to said carriage including a friction clutch, a device having a plurality of stops corresponding to character widths, and means for actuating a stop corresponding to the width of a selected character to control the action of said shaft on said carriage.

113. A typographic machine adapted to be controlled by an automatic controller including in combination a continuously driven shaft, a carriage for the impression receiving material, connections between said carriage and said shaft controlled by the automatic controller for progressing said carriage in either direction.

114. A typographic machine including in combination a carriage for the impression receiving material, a continuously rotating shaft, connections from said shaft to said carriage including a friction clutch, and means included in said connections for reversing the direction in which the shaft progresses the carriage.

115. A typographic machine including in combination a carriage for the impression receiving material, a continuously rotating shaft, connections from said shaft to said carriage including a friction clutch, means for reversing the direction in which the shaft progresses the carriage, and means for causing the carriage to be intermittently progressed varying distances.

116. A typographic machine including in combination a traveling carrier having a plurality of upper and lower case type thereon, means for positioning the type carrier to present a particular type for impression, and means in train with said carrier and positioning means for varying the relative position of said type carrier, and its said positioning means to present either the upper or lower case character for impression.

117. A typographic machine including in combination character impressing means, a controller strip adapted to be fed through the machine, and having character indications, means coöperating with said controller and with said character impressing means to select characters in accordance with the indications of the controller, a carriage for the impression receiving material, and means for positively advancing said carriage a letter-width at a time, corresponding to the width of the letter to be printed.

118. A typographic machine including in combination character impressing means, a controller strip adapted to be fed through the machine, and having character indications, means coöperating with said controller and with said character impressing means to select characters in accordance with the indications of the controller, a carriage for the impression receiving material, and means controlled by said controller for positively advancing said carriage a letter-width at a time corresponding to the width of the letter to be printed.

119. A typographic machine including in combination intermittently rotating character impressing means, a controller strip adapted to be fed through the machine, and having character indications, means coöperating with said controller and with said character impressing means to select successive characters in accordance with the indications of the controller, a carriage for the impression receiving material, and means for positively advancing said carriage a letter-width at a time corresponding to the width of the letter to be printed.

120. A typographic machine adapted to print inked lines including in combination character impression means, means for inking the characters, a controller strip adapted to be fed through the machine, and having character indications, means coöperating with said controller and said character impressing means to select characters in accordance with the indications of the controller, a carriage for the impression receiving material, and means for positively advancing said carriage a letter width at a time corresponding to the width of the letter to be printed.

121. A typographic machine adapted to print inked lines including in combination character impression means, means for inking the characters while away from impression, a controller strip adapted to be fed through the machine, and having character indications, means coöperating with said controller and said character impression means to select characters in accordance with the indications of the controller, a carriage for the impression receiving material, and means for positively advancing said carriage a letter width at a time corresponding to the width of the letter to be printed.

122. A typographic machine adapted to print inked lines including in combination character impression means, means for inking the characters while away from impression, a controller strip adapted to be fed through the machine, and having character indications, means coöperating with said controller and said character impression means to select characters in accordance with the indications of the controller, a carriage for the impression receiving material, and means controlled by said controller for positively advancing said carriage a letter-width at a time corresponding to the width of the letter to be printed.

123. A typographic machine adapted to print inked lines including in combination character impressing means, means for inking the characters, a controller having character indications, a carriage for the impression receiving material, a constantly driven power shaft, driving connections for said carriage, a friction clutch between said carriage and said shaft, and settable means set by said controller for determining the amount of travel of said carriage for successive impressions.

124. A typographic machine adapted to print inked lines including in combination character impressing means, means for inking the characters, a controller having character indications, a carriage for the impression receiving material, a constantly driven power shaft, driving connections for said carriage and a friction clutch between said carriage and said shaft, means for permitting said carriage to be intermittently driven by said shaft through said clutch, and settable means set by said controller for determining the amount of travel of said carriage for successive impressions.

125. A typographic machine adapted to print inked lines including in combination character impressing means, means for inking the characters while away from impression, a controller having character indications, a carriage for the impression receiving material, a constantly driven power shaft, driving connections for said carriage, a friction clutch between said carriage and said shaft, and settable means set by said controller for determining the amount of travel of said carriage for successive impressions.

126. A typographic machine adapted to print inked lines including in combination character impressing means, means for inking the characters while away from impression, a controller having character indications, a carriage for the impression receiving material, a constantly driven power shaft, driving connections for said carriage and a friction clutch between said carriage and said shaft, means for permitting said carriage to be intermittently driven by said shaft through said clutch, and settable means set by said controller for determining the amount of travel of said carriage for successive impressions.

127. A typographic machine including in combination rotary character impressing means, a carriage for the impression receiving material, rotary means tending to continuously progress said carriage, and rotary means comprising a plurality of selective devices, means for selecting said devices, a selected device acting to alternately prevent and permit said progression.

128. A typographic machine including in combination rotary character impressing means, a controller having character indications, means coöperating with said controller and said character impressing means to select characters in accordance with the indications of the controller, a carriage for the impression receiving material, rotary means tending to continuously progress said carriage, and rotary means comprising a plurality of selective devices, means controlled by said controller for selecting one of said devices, the selected device acting to alternately prevent and permit said progression.

129. A typographic machine adapted to print inked lines including in combination rotary character impressing means, means for inking the characters, a carriage for the impression receiving material, rotary means tending to continuously progress said carriage, and rotary means comprising a plurality of selective devices, means for selecting said devices, a selected device acting to alternately prevent and permit said progression.

130. A typographic machine adapted to print inked lines including in combination rotary character impressing means, means for inking the characters while away from impression, a carriage for the impression receiving material, rotary means tending to continuously progress said carriage, and rotary means comprising a plurality of selective devices, means for selecting said devices, a selected device acting to alternately prevent and permit said progression.

131. A typographic machine adapted to print inked lines including in combination a type carrier having mounted thereon types of different widths, means for inking the types, an automatic controller strip coöperating with said type carrier to select the type to be impressed, a carriage for the impression receiving material, means tending to continuously progress said carriage, and means for permitting and preventing such progress and limiting same to a distance corresponding to the width of the next character to be printed.

132. A typographic machine adapted to print inked lines including in combination a type carrier having mounted thereon types of different widths, means for inking the types while away from impression, an automatic controller strip coöperating with said type carrier to select the type to be impressed, a carriage for the impression receiving material, means tending to continuously progress said carriage, and means for permitting and preventing such progress and limiting same to a distance corresponding to the width of the next character to be printed.

133. A typographic machine including in combination means for presenting types for impression, a carriage for the impression receiving material, means tending to continuously progress said carriage, means for reversing the directions of action of said progressing means upon the carriage, and means for permitting or preventing the progression of the carriage by said progressing means.

134. A typographic machine including in combination a type carrier, an automatic controller strip having selecting devices for selecting the characters to be impressed, a carriage for the impression receiving material, means for progressing the carriage, and means controlled by the controller for determining the extent and direction of movement of the carriage by said progressing means.

135. A typographic machine including in combination a type carrier, an automatic controller strip having selecting devices for selecting the characters to be impressed, a carriage for the impression receiving material, means tending to continuously progress said carriage, and means including a plurality of settable devices controlled by the controller for determining the extent and direction of movement of the carriage by said progressing means.

136. A typographic machine for printing inked characters in line series including in combination means for presenting types for impression, means for inking the types, a carriage for the impression receiving material, means tending to continuously progress said carriage, means for reversing the directions of action of said progressing means upon the carriage, and means for permitting or preventing the progression of the carriage by said progressing means.

137. A typographic machine for printing inked characters in line series including in combination a type carrier, means for inking the types, a controller strip adapted to run through the machine and having selecting devices for selecting the characters to be impressed, a carriage for the impression receiving material, means for progressing the carriage, and means controlled by the controller for determining the extent and direction of movement of the carriage by said progressing means.

138. A typographic machine for printing inked characters in line series including in combination a type carrier, means for inking the types, a controller strip adapted to run through the machine and having selecting devices for selecting the characters to be impressed, a carriage for the impression receiving material, means tending to continuously progress said carriage, and means controlled by the controller for determining the extent and direction of movement of the carriage by said progressing means in both directions.

139. A typographic machine for printing inked characters in line series including in combination means for presenting types for impression, means for inking the types prior to impression, a carriage for the impression receiving material, means tending to progress said carriage, means for reversing the directions of action of said progressing means upon the carriage, and means for permitting or preventing the progression of the carriage by said progressing means.

140. A typographic machine for printing inked characters in line series including in combination a type carrier, means for inking the types prior to impression, a controller having selecting devices for selecting the characters to be impressed, a carriage for the impression receiving material, means for progressing the carriage, and means controlled by the controller for determining the extent and direction of movement of the carriage by said progressing means in both directions.

141. A typographic machine for printing inked characters in line series including in combination a type carrier, means for inking the types prior to impression, an automatic controller strip adapted to run through the machine and having selecting devices for selecting the characters to be impressed, a carriage for the impression receiving material, means tending to continuously progress said carriage, and means controlled by the controller for determining the extent and direction of movement of the carriage by said progressing means.

142. A typographic machine adapted to make character impressions in line series including in combination character bearing means, an automatic controller strip adapted to run through the machine and having character selecting indications, means coöperating with said controller and said character bearing means for selecting characters in accordance with the indications of the controller, a carriage for the impression receiving material, carriage progressing means, and means coöperating with the controller and said carriage progressing means for progressing the carriage intermittently in accordance with the impression of the successive characters indicated by the controller, and for returning the carriage when a line is completed.

143. A typographic machine adapted to make inked character impressions in line series including in combination character bearing means, character inking means, an automatic controller strip adapted to run through the machine and having character selecting indications, means coöperating with said controller and said character bearing means for selecting characters in accordance with the indications of the controller, a carriage for the impression receiving material, carriage progressing means, and means coöperating with the controller and said carriage progressing means for progressing the carriage intermittently in accordance with the impression of the successive characters indicated by the controller, and for returning the carriage when a line is completed.

144. A typographic machine adapted to make inked character impressions in line series including in combination character bearing means, means for inking a character prior to its being impressed, an automatic controller strip adapted to run through the machine and having character selecting indications, means coöperating with said controller and said character bearing means for selecting characters in accordance with the indications of the controller, a carriage for the impression receiving material, carriage progressing means, and means coöperating with the controller and said carriage progressing means for progressing the carriage intermittently in accordance with the impression of the successive characters indicated by the controller, and for returning the carriage when a line is completed.

145. A typographic machine adapted to make character impressions in line series, including in combination, character bearing means having characters of various widths, an automatic controller strip adapted to run through the machine and having character selecting indications, means coöperating with said controller and said character bearing means for selecting characters in accordance with the indications of the controller, a carriage for the impression receiving material, carriage progressing means, and means coöperating with the controller and said carriage progressing means for progressing the carriage intermittently varying distances in accordance with the width of the selected character, and for returning the carriage when a line is completed.

146. A typographic machine adapted to make inked character impressions in line series including in combination, character bearing means having characters of various widths, character inking means, an automatic controller strip adapted to run through the machine and having character selecting indications, means coöperating with said controller and said character bearing means for selecting characters in accordance with the indications of the controller, a carriage for the impression receiving material, carriage progressing means, and means coöperating with the controller and said carriage progressing means for progressing the carriage intermittently varying distances in accordance with the width of the selected character and for returning the carriage when a line is completed.

147. A typographic machine adapted to make inked character impressions in line series including in combination, character bearing means having characters of various widths, means for inking a character prior to its being impressed, an automatic controller strip adapted to run through the machine and having character selecting indications, means coöperating with said controller and said character bearing means for selecting characters in accordance with the indications of the controller, a carriage for the impression receiving material, carriage progressing means, and means coöperating with the controller and said carriage progressing means for progressing the carriage intermittently varying distances in accordance with the width of the selected character and for returning the carriage when a line is completed.

148. A typographic machine adapted to impress characters including in combination a carriage for the impression receiving material, a continuously rotating shaft, connections from said shaft to said carriage including a friction clutch, means for causing the carriage to be intermittently progressed varying distances, and means for reversing the direction in which the shaft progresses the carriage and for progressing it uninterruptedly to position for beginning a new line.

149. A typographic machine including in combination a traveling carrier having a single series of types, said series comprising a plurality both of upper and lower case types, means for traveling said carrier in the direction of said series to present a desired type at the place of impression, means for controlling said traveling means to present a selected type for impression, and means for varying the position of said carrier to said traveling means to present either the upper or lower case of the selected character for impression.

150. A typographic machine including in combination a traveling carrier having a plurality of upper and lower case types arranged in a single series thereon, means for traveling said carrier in the direction of said series to present a desired type at the place of impression, means for controlling said traveling means to present a selected type for impression, and means for varying the position of said carrier to said traveling means in the direction of said series to present either the upper or lower case of the selected character for impression.

151. A typographic machine including in combination a rotatable carrier having a single circular series of upper and lower case types thereon, means for positioning the type carrier to present a selected type for impression, and means for circularly varying the relative position of said type carrier and its positioning means to present either the upper or lower case character for impression.

152. A typographic machine adapted to be controlled by a controller including in combination a traveling carrier having a plurality of upper and lower case types thereon, a controller having character indications and case indications thereon, means coöperating with the controller and type carrier for positioning the type carrier in accordance with the indications of the controller, and means coöperating with the controller and type carrier for further positioning the type carrier in accordance with the case indications of the controller.

153. A typographic machine adapted to print inked ypes including in combination a traveling carrier having th on in a single series a plurality of upper and lower case types, a carriage for the impression receiving material, means for positioning the type carrier to present a selected type for impression, means for causing impression contact between the selected type and the impression receiving material, inking means for inking the types between impressions, and means for varying the position of said type carrier and said positioning means to present either the upper or lower case character for impression.

154. A typographic machine adapted to print inked characters including in combination a traveling carrier having a plurality of upper and lower case types thereon, a controller having character and case indications thereon, means coöperating with said controller and said type carrier for causing the type carrier to present a type for impression in accordance with the indications of the controller, a carriage for the impression receiving material, means for bringing the selected character and the impression receiving material into impression contact, means for inking the types between impressions, and means coöperating with the case indications of the controller and the type carrier for presenting a selected case of a selected character at impression.

155. A typographic machine including in combination normally rotating character bearing means, means for arresting said character bearing means during impression, a carriage for the impression receiving material, means tending to continuously progress said carriage, and automatically settable means including a member corresponding to the extent of travel of the carriage and settable devices corresponding to the width of various letters for controlling the movement of said carriage.

156. A typographic machine including in combination normally rotating character bearing means, means for arresting said character bearing means during impression, a carriage for the impression receiving material, means tending to continuously progress said carriage, and automatically settable means including a member corresponding to the extent of travel of the carriage and settable devices corresponding to the width of various letters for controlling the extent of movement of said carriage for each character impressed.

157. A typographic machine including in combination character impressing means, a carriage for the impression receiving material, an automatic controller strip for selecting the characters to be impressed and means automatically settable in accordance with the controller selections for controlling the extent of movement of the carriage for each character impressed.

158. A typographic machine including in combination normally rotating character bearing means, means for inking the characters when off impression, means for arresting said character bearing means during impression, a carriage for the impression receiving material, means tending to continuously progress said carriage and automatically settable means including a member corresponding to the extent of travel of the carriage and settable devices corresponding to the width of various letters for controlling the movement of said carriage.

159. A typographic machine including in combination normally rotating character bearing means, means for inking the characters, means for arresting said character bearing means during impression, a carriage for the impression receiving material, means tending to continuously progress said carriage, and automatically settable means including a member corresponding to the extent of travel of the carriage and settable devices corresponding to the width of various letters for controlling the movement of said carriage.

160. A typographic machine including in combination character impressing means, means for inking the characters when off impression, a carriage for the impression receiving material, an automatic controller strip for selecting the characters to be impressed and means automatically settable in accordance with the controller selections for controlling the extent of movement of the carriage for each character impressed.

161. A typographic machine including in combination character impressing means, means for inking the characters, a carriage for the impression receiving material, an automatic controller strip for selecting the characters to be impressed and means automatically settable in accordance with the controller selections for controlling the extent of movement of the carriage for each character impressed.

162. A typographic machine including in combination character bearing means normally in rotation, means for arresting said character-bearing means for impression, a reciprocating carriage for the impression receiving material, and automatically settable means for varying and controlling the travel of the carriage for characters of different width.

163. A typographic machine including in combination character bearing means normally in rotation, means for arresting said character-bearing means for impression, a reciprocating carriage for the impression receiving material, means for moving the carriage to and from impression contact, and automatically settable means for varying and controlling the travel of the carriage for characters of different width.

164. A typographic machine including in combination character bearing means normally in rotation, means for arresting said character-bearing means for impression, a reciprocating carriage for the impression receiving material, and also means for inking said characters, and automatically settable means for varying and controlling the travel of the carriage for characters of different width.

165. A typographic machine including in combination character bearing means normally in rotation, an automatic controller strip and means coöperating therewith to arrest said character bearing means for impression, a reciprocating carriage for the impression receiving material, and automatically settable means for varying and controlling the travel of the carriage for characters of different width.

166. A typographic machine including in combination a type carrier, a controller having selecting devices for selecting the characters to be impressed, a carriage for the impression receiving material, means for progressing the carriage, and means controlled by the controller for determining the extent and direction of movement of the carriage by said progressing means in both directions.

167. An automatic typographic apparatus adapted to operate under the control of a controller having character and indenting perforations arranged in transverse lines, said apparatus comprising selective means operating under the control of the perforations on a single transverse line to print selectively a plurality of characters and to indent the printed matter.

168. In a pattern-controlled printing-machine, a pattern-feeding mechanism, printing, inking and impression-taking mechanisms, and a paper-carrying traveling carriage, in combination with means controlled by the pattern for automatically stopping the machine at the conclusion of a printed line, means for automatically returning the carriage to initial position and means for automatically moving the paper for the printing of a new line.

169. In a typographic machine of the class described, a letter space feed mechanism controlled by a dial having a plurality of movable pins, means for projecting the pins, means for restoring the pins, and means controlled by an automatic letter selecting device for selecting the pin to be projected.

170. A typographic machine including in combination a rotatable type carrier, means for controlling the rotating movements of the type carrier, a controller, and means coacting therewith for simultaneously determining a plurality of successive movements of said type carrier.

171. A typographic machine operating by means of a controller and including in combination a type carrier having a plurality of types, means tending to continuously rotate said type carrier, and means operated by the controller for permitting and preventing such rotation to selectively position the types of the type carrier for impression in accordance with the indications of the controller.

CHAS. T. MOORE.

Witnesses:
A. P. KNIGHT,
J. GREEN.